US011162001B2

(12) United States Patent
Schoelkopf et al.

(10) Patent No.: US 11,162,001 B2
(45) Date of Patent: Nov. 2, 2021

(54) COMPOSITION AND METHOD FOR CONTROLLING THE WETTABILITY OF SURFACES

(71) Applicant: Omya International AG, Oftringen (CH)

(72) Inventors: Joachim Schoelkopf, Oberkulm (CH); Hans-Joachim Weitzel, Suhr (CH)

(73) Assignee: OMYA INTERNATIONAL AG, Oftringen (CH)

( * ) Notice: Subject to any disclaimer, the term of this patent is extended or adjusted under 35 U.S.C. 154(b) by 147 days.

(21) Appl. No.: 16/448,827

(22) Filed: Jun. 21, 2019

(65) Prior Publication Data
US 2019/0309189 A1    Oct. 10, 2019

Related U.S. Application Data

(63) Continuation of application No. 15/716,686, filed on Sep. 27, 2017, now Pat. No. 10,377,920, which is a continuation of application No. 14/370,867, filed as application No. PCT/EP2013/052128 on Feb. 4, 2013, now Pat. No. 10,047,247.

(60) Provisional application No. 61/599,021, filed on Feb. 15, 2012.

(30) Foreign Application Priority Data

Feb. 9, 2012 (EP) ..................................... 12154687

(51) Int. Cl.
| C09D 191/00 | (2006.01) |
|---|---|
| B05D 5/00 | (2006.01) |
| C08K 9/04 | (2006.01) |
| C09D 5/16 | (2006.01) |
| D21H 17/00 | (2006.01) |
| C09C 1/02 | (2006.01) |
| D21H 17/17 | (2006.01) |
| D21H 19/38 | (2006.01) |
| D21H 21/16 | (2006.01) |
| B05D 7/06 | (2006.01) |
| B05D 7/14 | (2006.01) |
| B05D 7/00 | (2006.01) |
| C09D 125/14 | (2006.01) |
| C09D 129/04 | (2006.01) |
| C09D 133/08 | (2006.01) |

(52) U.S. Cl.
CPC ............. *C09D 191/00* (2013.01); *B05D 5/00* (2013.01); *B05D 7/06* (2013.01); *B05D 7/14* (2013.01); *B05D 7/548* (2013.01); *C09C 1/021* (2013.01); *C09D 5/1681* (2013.01); *C09D 125/14* (2013.01); *C09D 129/04* (2013.01); *C09D 133/08* (2013.01); *D21H 17/00* (2013.01); *D21H 17/17* (2013.01); *D21H 19/385* (2013.01); *D21H 21/16* (2013.01); *C01P 2004/03* (2013.01); *C01P 2004/61* (2013.01); *C01P 2004/62* (2013.01); *C01P 2006/12* (2013.01); *C01P 2006/22* (2013.01); *C08K 9/04* (2013.01)

(58) Field of Classification Search
CPC .......... C09D 5/1681; B05D 5/00; C08K 9/04
See application file for complete search history.

(56) References Cited

U.S. PATENT DOCUMENTS

| 4,892,590 | A | 1/1990 | Gill et al. |
|---|---|---|---|
| 5,695,733 | A | 12/1997 | Kroc et al. |
| 6,126,783 | A | 10/2000 | Gill |
| 6,143,065 | A | 11/2000 | Freeman et al. |
| 6,342,100 | B1 | 1/2002 | Nover et al. |
| 7,211,313 | B2 | 5/2007 | Nun et al. |
| 7,553,526 | B2 * | 6/2009 | Campbell .............. B41M 5/506 |
| | | | 428/32.21 |
| 2004/0166047 | A1 | 8/2004 | Vogels et al. |
| 2006/0286305 | A1 | 12/2006 | Thies et al. |
| 2011/0259537 | A1 | 10/2011 | Husband et al. |
| 2014/0155522 | A1 | 6/2014 | Simpson |
| 2014/0373757 | A1 | 12/2014 | Schoelkopf et al. |

FOREIGN PATENT DOCUMENTS

| CN | 102059347 | A | 5/2011 |
|---|---|---|---|
| DE | 19738481 | A1 | 3/1999 |
| EP | 1479738 | A1 | 11/2004 |
| EP | 2168572 | A1 | 3/2010 |
| EP | 2371766 | A1 | 10/2011 |
| WO | 0039049 | A1 | 7/2000 |
| WO | 2004052784 | A2 | 6/2004 |

OTHER PUBLICATIONS

Communication of Notice of Opposition dated Feb. 15, 2017 for EP 12154687.3.
D1: Satinweiß, received at the EPO Feb. 6, 2017, p. 27 of 143.
D2: Auszug, received at the EPO Feb. 6, 2017, p. 28 0f 143.
D20: "Optimale Deckung." Farbe & Lack. May 2005.

(Continued)

*Primary Examiner* — Vickey Nerangis
(74) *Attorney, Agent, or Firm* — Heslin Rothenberg Farley & Mesiti P.C,

(57) ABSTRACT

The present invention relates to a composition comprising hedgehog shaped particles, at least one binder, and at least one hydrophobizing agent and/or at least one hydrophilizing agent, a method for controlling the wettability of substrate surfaces using these compositions, as well as a material comprising these compositions.

18 Claims, 12 Drawing Sheets

(56) References Cited

OTHER PUBLICATIONS

D26: Le Carbonate De Chaux—Librarie Universitaire 1966.
D28: Meisen et al. Doctoral Thesis—Sep. 19, 2008.
D29: "The Economics of Precipitated Calcium Carbonate." Seventh Edition 2008. Roskill Information Services Ltd.
Grounds for Opposition dated Feb. 6, 2017 for EP 12154687.3.
Wang et al. "Fabrication and anti-frosting performance of super hydrophobic coating based on modified nano-sized calcium carbonate and ordinary polyacrylate." Applied Surface Science 253 (2007) 8818-8824.
Special Minerals. "Precipitated calcium carbonate (PCC) by Specialty Minerals", 2016 [online] [retrieved on Aug. 5, 2016]. Retrieved from <URL:http://www.mineralstech.com/Pages/SMI/PCC-Pigments.aspx>.
Hu et al. "Water resistance improvement of paper by superhydrophobic modification with microsized CaCO3 and fatty acid coating." Colloids and Surfaces vol. 351, No. 1-3, Nov. 5, 2009.
Wang et al. "Synthesis and character of super-hydrophobic CaC03 powder in situ." Powder Technology vol. 200, No. 1-2, Jun. 15, 2010.
Zhu et al. "Formation of star-shaped calcite crystals with <Mg2+> inorganic mineralizer without organic template." Journal of Solid State Chemistry, Orlando vol. 179, No. 4, Apr. 1, 2006.
Hu et al. "Superhydrophobic surface fabricated from fatty acid-modified precipitated calcium carbonate." Industrial & Engineering Chemistry Research vol. 49, No. 12, Jun. 16, 2010.
Wang et al. "Self-assembled biomimetic superhydrophobic CaC03 coating inspired from fouling mineralization in geothermal water." Langmuir vol. 27, No. 20, Oct. 18, 2011.
Hu et al. "Water resistance improvement of paper by superhydrophobic modification with microsized CaCO3 and fatty acid coating." Colloids and Surfaces A: Physicachemical and Engineering Aspects, Elsevier, Amsterdam, NL, vol. 351, Nos. 1-3, 5, Nov. 2009, pp. 65-70.
Wang et al. "Synthesis and character of super-hydrophobic CaCO3 powder in situ." Powder Technology, Elsevier Sequoia, Lusanne CH, vol. 200, Nos. 1-2, Jun. 15, 2010, pp. 84-86.
The International Search Report dated Feb. 4, 2013 for PCT/EP2-13/052128.
D2: Auszug, p. 28 of 143. Feb. 6, 2017 with translation.
D8: Jülich et al., "Die Wirtschafllichkeit von gefallten calciumcarbonaten in dispersionsfarben", p. 36 of 143. Feb. 6, 2017 with translation.
D9: Socal®P2—"Precipitated calcium carbonate." Solvay Advanced Function Minerals, p. 37 of 143. 2004.
D10: Socal—"Le Carbonate De Calcium Précipité." Solvay, p. 38 of 148. 1995.
D11: Socal®—"Gefälltes Calciumcarbonat." Solvay, p. 67 of 143. Apr. 14, 2005.
D12: Socal® E2, Product Data Sheet—"Precipitated Calcium Carbonate." Solvay Advanced Functional Minerals, p. 122 of 143. 2004.
D13: Socal® E2, Product Data Sheet—"Precipitated Calcium Carbonate." Colvay Advanced Functional Minerals, p. 122 of 143. 2004.
D14: Socal® N2, Product Data Sheet—Precipitated Calcium Carbonate. Solvay Advanced Functional Minerals, p. 123 of 143. 2004.
D15: Socal® NP, Product Data Sheet—"Precipitated Calcium Carbonate." Solvay Advanced Functional Minerals, p. 124 of 143. 2004.
D16: Socal® NZ, Product Data—"Precipitated Calcium Carbonate." Solvay Advanced Functional Minerals, p. 125 of 143. 2008.
D17: Socal® 90A, Product Data—"Precipitated Calcium Carbonate." Solvay Advanced Functional Minerals, p. 126 of 143. 2005.
D18: Socal®92E, Product Data—"Precipitated Calcium Carbonate." Solvay Advanced Functional Minerals, p. 127 of 143. 2004.
D22: Gysou "Füllstoffe." Shaefer Kalk GmbH & Co. 2005.
D23: Kittel "Lehrbuch der Lacke und Beschichtungen." 2003.
D30: Lücket Pigment + Füllstoff—Tabellen. 2002.
Summons to Oral Proceedings pursuant to Rule 115(1) EPC in EP Application No. 12154687.3. Oct. 27, 2020.
Hooper, "Calcium Carbonate Fillers in Rosin-Sized Papers", A Doctoral Thesis, Loughborough University of Technology, 208 pages. Dec. 1993.
Thesaurus of Pulp and Paper Terminology, Institute of Paper Science and Technology, 3 pages. 1991.
Satin White edited by Michael Groteklaes, Thieme Rompp, 3 pages, with translation. Jun. 25, 2017.

\* cited by examiner

COMPOSITION AND METHOD FOR CONTROLLING THE WETTABILITY OF SURFACES

CROSS-REFERENCE TO RELATED APPLICATIONS

This is a continuation of U.S. application Ser. No. 15/716,686, filed Sep. 27, 2017, which is a continuation of U.S. application Ser. No. 14/370,867, filed Jul. 7, 2014, which is the U.S. National phase of PCT Application No. PCT/EP2013/052128, filed Feb. 4, 2013, which claims priority to U.S. Provisional Application No. 61/599,021, filed Feb. 15, 2012, and European Application No. 12154687.3, filed Feb. 9, 2012, the contents of which are hereby incorporated by reference.

The present invention relates to a composition for controlling the wettability of surfaces, to coating formulations comprising the same, to a method for controlling the wettability of surfaces using this composition or a corresponding coating formulation, and their uses.

There is a continuous interest in providing tailor-made properties to materials by controlling their surface structure properties. One well-known example therefor is the lotus effect referring to very high water repellence (superhydrophobicity) of certain plant leaves, wherein dirt particles are picked up by water droplets due to a complex micro- and nanoscopic architecture of the surface, which minimizes adhesion.

Due to their high surface tension, water droplets tend to minimize their surface trying to achieve a spherical shape. On contact with a surface, adhesion forces result in wetting of the surface.

In nature, the self-cleaning properties are due to a hydrophobic water-repellent double structure of the leaf surface formed out of a characteristic epidermis and the covering waxes. The epidermis of the lotus plant has papillae with 10 to 20 µm in height and 10 to 15 µm in width on which the so-called epicuticular waxes are imposed. These superimposed waxes are hydrophobic and form the second layer of the double structure, enabling the contact area and the adhesion force between surface and droplet to be significantly reduced resulting in a self-cleaning process.

The surface free energy of a wax is relatively low and a drop of water on a smooth surface of this wax material would show a contact angle >90° but probably <120°. The structural impact derives from the exposed tips and edges of the papillae which minimize the solid/liquid contact area, resulting in a dominance of the cohesive forces of the liquid drop striving for a spherical shape (Cassie and Baxter, *Trans. Faraday Soc.* 1944, 40, 546).

As a result, a complete repellence can be observed with a contact angle approaching 180° and the droplet rolls off the surface leaving no trace. A contrasting phenomenon is also known when the intrinsic contact angle is relatively low, e.g. <45°. A designed textured surface can act to enhance the wetting, the apparent contact angle becomes 0° and the phenomenon is called super-wettability (Wenzel, *Ind. Eng. Chem.* 1936, 28, 988).

Especially the lotus effect was intensively studied from a theoretical point of view (cf. e.g. Narhe et al., Water Condensation on a super-hydrophobic spike surface, *Europhys. Lett.* 2006, 75(1), 98-104; Wier et al., *Langmuir* 2006, 22, 2433-2436; Gao et al., *Langmuir* 2007, 23, 3762-3765) as well as with respect to its practical use in technical applications, such as treatments, coatings, paints, roof tiles, fabrics and other surfaces that can stay dry and clean themselves in the same way as the lotus leaf.

In this respect, the required surface structure was obtained by rather complicated techniques modifying the surface itself, e.g. by applying 248 nm KrF excimer-laser irradiation in vacuum on PET foils (Heitz et al., Dendritic Surface Structures on Excimer-Laser Irradiated PET Foils; *Appl. Phys. A* 1993, 56, 329-333), plasmapolymerization on the substrates, argon plasma etching, silanization of silicone wafers, etc. (Chen et. al., Ultrahydrophobic and Ultralyophobic Surfaces: Some Comments and Examples; *Langmuir* 1999, 15, 3395-3399; Öner et al., Ultrahydrophobic surfaces. Effects of Topography Length Scales on Wettability, *Langmuir* 2000, 16, 7777-7782); the preparation of complex and oriented ZnO nanostructures using controlled seeded growth and citrate anions that selectively adsorb on ZnO basal planes as the structure directing agent (Tian et al., *Complex and oriented ZnO nanostructures*, nature materials 2003, 2, 821-826).

In industrial applications, however, problems arise from mechanical instability, as artificial surfaces, unlike plant structures, are not self-renewing, and there is still need for further innovative material providing a possibility to control the surface properties of different materials.

Furthermore, there is a need for readily applicable formulations, i.e. formulations which may be directly applied onto the substrate surface in a readily operable and available manner.

In this respect, there were some approaches to provide substrates with the Lotus effect by coating formulations. Thus, e.g. EP 1 144 332 B1 discloses coating formulations consisting of a dispersion of a binding agent, including at least one hydrophobic resin, resin fabricated material and/or wax, filler and optionally usual additives, wherein the contained filler has an at least bimodal particle size distribution, whereby one particle size region (A) has a mean particle diameter of at least 5 µm and the other particle size region (B) has a particle diameter of not greater than 3 µm and the weight ratio of the particles of the first particle size region (A) to the particles of the last particle size region (B) amounts to 0.01:1 to 12:1, and wherein the hydrophilic characteristics of the components of the dispersion are chosen in such a way that the initial static contact angle is greater than 130° after three minutes of equilibration.

However, none of the mentioned technical solutions directed to the lotus effect do address a method for controlling wettability by certain formulations, i.e. to control wettability in a scale of superhydrophobicity to superwettability as desired.

It has now been found that hedgehog shaped particles may be advantageously used in surface modifying applications by embedding them into a coating layer using binders in such a way that the surface under a SEM microscope still shows exposed spikes and tips. If in combination with such hedgehog shaped particles, and coating formulation, a hydrophobization and/or hydrophilization agent is added and/or applied on top in a thin layer (monolayer to multilayer), the wettability can be controlled accurately from extremely hydrophobic to extremely hydrophilic.

It has also been found that mixtures of pre-hydrophobized and pre-hydrophilized hedgehog shaped particles may be advantageously used. When the amount of hydrophobized particles surpasses the percolation threshold the system may have a lotus effect like roll-off of droplets while still maintaining hydrophilic sites which collect water by adsorption and allow for droplet growth to a given size where gravity forces overcome the adhesion forces.

Thus, the present invention relates to a composition comprising
hedgehog shaped particles,
at least one binder, and
at least one hydrophobizing agent and/or at least one hydrophilizing agent.

"Hedgehog shaped particles" in the context of the present invention means particles having the shape of a hedgehog, which means that the particles are shaped such that spikes and/or tips are essentially radially extending from a core. This shape may be due to a corresponding crystal growth or may be achieved by moulding or templating the particles by techniques known to the person skilled in the art.

It is also possible that the hedgehog shape is due to the agglomeration or formation of clusters of needle like crystals to form a hedgehog like shape.

Generally, the hedgehog shaped particles may be composed of any suitable material. In a preferred embodiment, the hedgehog shaped particles are composed of a material selected from the group comprising calcium carbonate containing material, especially precipitated calcium carbonate, natural calcium carbonate containing material, satin white, and mixtures thereof.

If the hedgehog shaped particles are composed of precipitated calcium carbonate (PCC), it is especially preferred that the hedgehog shaped particles are composed of a material comprising aragonitic, calcitic, vateritic precipitated calcium carbonate, or mixtures thereof.

Particularly useful in the present invention are hedgehog shaped particles being composed of a material comprising clusters and/or aggregates of scalenohedral or orthorhombic-dipyramidal precipitated calcium carbonate crystals.

PCC which may be especially useful in the present invention is obtained by a process described in unpublished European patent application No. 10 188 840.2, wherein low quality carbonates can be transformed into very pure precipitated calcium carbonates with an excellent brightness and defined structure.

This is achieved by
a) providing and calcining calcium carbonate comprising material;
b) slaking the reaction product obtained from step a) with an aqueous ammonium chloride solution;
c) separating insoluble components from the calcium chloride solution obtained from step b);
d) carbonating the calcium chloride solution obtained from step c);
e) separating the precipitated calcium carbonate obtained from step d).

The special feature of this PCC production process is the combination of calcium oxide obtained from step a) with an aqueous solution of ammonium chloride in step b), resulting in the formation of highly soluble calcium chloride, whereas undesired impurities initially contained in the calcium carbonate feed material remain insoluble or are at least less soluble than calcium chloride in the resulting alkaline ammoniac medium allowing a separation.

Furthermore, due to the use of seed crystals or other structure modifying chemicals to the calcium chloride-solution obtained from step c) before precipitation, it is possible to ensure that the precipitation products crystallize in a certain shape and particle size range.

Furthermore, PCC which may be advantageously used in the composition of the present invention may be obtained by a process described in EP 2 371 766, namely a process for preparing a precipitated calcium carbonate product comprising the steps of:

(a) preparing an aqueous suspension of precipitated calcium carbonate seeds by carbonating a suspension of $Ca(OH)_2$ in the presence of 0.005 to 0.030 moles of strontium, in the form of $Sr(OH)_2$, per mole of $Ca(OH)_2$ prior to or during carbonation; and
(b) forming an aqueous suspension of a precipitated calcium carbonate product by carbonating a slurry of $Ca(OH)_2$ in the presence of 0.5 to 5% by dry weight of the precipitated calcium carbonate seeds, wherein the precipitated calcium carbonate seeds have a $d_{50}$ that is less than the $d_{50}$ of the precipitated calcium carbonate product and the precipitated calcium carbonate seeds have an aragonitic polymorph content greater than or equal to the precipitated calcium carbonate product.

There are however also other techniques to obtain hedgehog shaped particles of PCC useful in the present invention, which are well-known in the art, e.g. from L. Zhu et al., Journal of Solid State Chemistry 179 (2006), 1247-1252.

The hedgehog shaped particles used in the present invention preferably have a BET specific surface area of from 1 to 50 m$^2$/g, especially preferably 2 to 40 m$^2$/g, more preferably 11 to 35 m$^2$/g, most preferably 15 to 20 m$^2$/g, measured using nitrogen and the BET method according to ISO 9277.

In a preferred embodiment the hedgehog shaped particles have a weight median particle diameter $d_{50}$ of from 1 µm to 50 µm, preferably of from 2 µm to 40 µm, more preferably of from 3 µm to 30 µm determined by the sedimentation method using a Sedigraph™ 5100 device from the company Micromeritics, USA. The measurement was performed in an aqueous solution of 0.1 wt-% $Na_4P_2O_7$. The samples were dispersed using a high-speed stirrer and ultrasound.

Hydrophobizing agents, as well as hydrophilizing agents, which may be advantageously used in the context of the present invention are those well-known in the art of coatings, paints, etc.

In an especially preferred embodiment, the hydrophobizing agent is selected from the group comprising fatty acids, such as stearic acid, palmitic acid, and their salts; alkylketene dimer; polyacrylamide resins; silicone resins, polysiloxanes, preferably polysiloxane modified with functional silicone resin, and mixtures thereof.

Especially preferred hydrophilizing agents are selected from the group comprising polyacrylic acids, salts of 1-hydroxyethane-1,1-diphosphonic acid, preferably alkali metal salts thereof, more preferably potassium salts thereof; and chelates of 1-hydroxyethane-1,1-diphosphonic acid, preferably aluminium hydroxide chelates thereof, more preferably aluminium hydroxide/1-hydroxyethane-1,1-diphosphonic acid chelates having a weight ratio of 1:5, and mixtures thereof.

The amounts of the at least one hydrophobizing agent and/or at least one hydrophilizing agents also depend on the desired wettability effect, and will be readily determinable by corresponding tests with the specific agents used.

Typically, the total amount of the at least one hydrophobizing agent and/or at least one hydrophilizing agents will be from 0.1 to 10 wt %, preferably 0.2 to 5 wt %, more preferably 0.3 to 2.4 wt %, most preferably 0.4 to 1.9 wt %, especially 0.5 to 1.5 wt %, based on the weight of the hedgehog shaped particles.

The binder used in the present invention may be any conventional binder used in the field of paper and board coating, paints and coatings, and impregnations. It is preferably selected from the group comprising latex binders, hybrid binder systems, preferably homopolymers or copolymers of acrylic and/or methacrylic acids, itaconic acid; and acid esters, such as e.g. ethylacrylate, butyl acrylate; styrene, unsubstituted or substituted vinyl chloride, vinyl acetate, ethylene, butadiene, acrylamides and acrylonitriles; silicone resins, water dilutable alkyd resins, acrylic/alkyd resin combinations, polyvinyl alcohol, natural oils, preferably linseed oil, and mixtures thereof.

If binders are used having hydrophobic and/or hydrophilic properties, the binders may act as the at least one hydrophobizing agent and/or the at least one hydrophilizing agent, i.e. binder and at least one hydrophobizing agent and/or at least one hydrophilizing agent are identical compounds.

Depending on the substrate and the nature of the hedgehog shaped particles as well as the hydrophobizing and/or hydrophilizing agents, a proper amount of the binder is one ensuring the binding of the different components with each other and with the substrate to be coated with the composition without influencing their properties.

Typically, the binder is present in an amount of up to 250 wt %, preferably up to 200 wt %, more preferably up to 150 wt %, most preferably up to 120 wt %, and especially preferably is present in an amount of from 1 to 50 wt %, preferably from 3 to 25 wt %, more preferably from 5 to 20 wt %, especially preferably from 10 to 15 wt %, based on the weight of the hedgehog shaped particles.

The composition may be provided in different forms.

In one embodiment of the invention, the hedgehog shaped particles are combined with the at least one hydrophobizing agent and/or at least one hydrophilizing agent, and the binder.

In another preferred embodiment, the hedgehog shaped particles are pre-treated with the at least one hydrophobizing agent and/or at least one hydrophilizing agent. Subsequently, the hedgehog shaped particles pre-treated with at least one hydrophobizing agent and/or at least one hydrophilizing agent, or mixtures thereof, are mixed with the binder, wherein, optionally, further at least one hydrophobizing agent and/or at least one hydrophilizing agent, which may be the same as, or different from the agent used in the pre-treatment may be additionally added.

The composition also includes embodiments, where the hedgehog shaped particles are first mixed with the binder and subsequently combined with the at least one hydrophobizing agent and/or at least one hydrophilizing agent.

The composition according to the present invention may be provided in the form of a coating formulation, wherein the composition, may be dissolved or dispersed in a suitable medium, e.g. a medium selected from the group comprising water, alcohol ethers, alcohols, aliphatic hydrocarbons, esters, and mixtures thereof.

In some embodiments, it may also be advantageous to use mixtures of solvents, such as mixtures of water with other solvents as e.g. those mentioned above, optionally in combination with conventional additives, such as coalescence agents, e.g. Texanol®; defoamers, preferably mineral oil and/or silicone based defoamers; rheology modifiers, preferably cellulosic ethers, layer silicates, associative and non-associative acrylics, or polyurethanes.

It is however also possible to use the composition as such, especially if one or more of the components are liquids and are present in a sufficient amount to distribute it evenly on the substrate surface, e.g. if linseed oil is used as a binder.

Furthermore, a coating formulation comprising the composition according to the invention may comprise common additives, such as dispersing agents, siliconizing agents, thickeners, rheology modifiers, anti-settling agents, defoamers, antioxidants, bluing agents, surfactants, crosslinkers, flame retardants, catalysts, pH buffers, fillers, dyes, pigments, optical brightners, waxes, coalescence agents, biocides etc. in free or encapsulated form, e.g. in the form of slow release preparations such as those described in EP 2 168 572, or unpublished U.S. patent application Ser. No. 11/188,597.6, and mixtures thereof.

As the compositions according to the invention allow for the control of the wettability of surfaces, a corresponding method for the control of the wettability of surfaces is a further aspect of the present invention.

This is achieved by coating the above described compositions according to the invention onto the substrate.

For this purpose, the composition according to the present invention is preferably provided in the form of a coating formulation as described above.

Thus, the substrate may be coated with a coating formulation of the composition comprising the hedgehog shaped particles, the at least one binder, and the at least one hydrophobizing agent and/or at least one hydrophilizing agent.

The substrate may also be coated with a coating formulation of the composition comprising the hedgehog shaped particles being pre-treated with the at least one hydrophobizing agent and/or at least one hydrophilizing agent and mixed with the at least one binder, wherein, optionally, further at least one hydrophobizing agent and/or at least one hydrophilizing agent, which may be the same as or different from the agent used in the pre-treatment may be additionally added, before the coating formulation is applied to the substrate.

In a further embodiment, the composition may be applied in the form of a coating formulation comprising the hedgehog shaped particles and the binder, which are coated onto the substrate first, whereas the at least one hydrophobizing and/or hydrophilizing agent is applied on top of the coating of hedgehog shaped particles and binder as one or several post-layers, such that the composition of the present invention is formed directly on the substrate.

Such post layers of at least one hydrophobizing and/or hydrophilizing agent may generally be applied with respect to any one of the above-described coating formulations, i.e. may also be additionally applied onto a coating of mixtures of the hedgehog shaped particles, the at least one hydrophobizing and/or hydrophilizing agent, and the binder, as well as mixtures of hedgehog shaped particles pre-treated with at least one hydrophobizing agent and/or at least one hydrophilizing agent, or mixtures thereof, and the binder, wherein, optionally, further at least one hydrophobizing agent and/or at least one hydrophilizing agent, which may be the same as or different from the agent used in the pre-treatment, or the post-layer, may be additionally added.

It may also be advantageous to apply post-layers of further ingredients and additives onto the coatings described above, preferably materials selected from the group comprising resins, silicones, and tetrafluoro compounds.

The coating as well as the application of post-layers may be carried out by conventional techniques well-known in the art and suitable for the respective substrates, e.g. by spraying, immersion coating, rolling or brushing, wherein the application of the post-layer advantageously is carried out in the form of a corresponding solution or dispersion of the at least one hydrophobizing agent and/or at least one hydrophilizing agent or other ingredient or additive, when the coating has already dried.

Coatings as well as post-layers of the same or different compositions and ingredients may be applied once or several times.

The substrate may generally be any substrate, e.g. a substrate selected from the group comprising paper, board, wall-paper, wood, wood composites such as flake board, plastics, foil, concrete, coated or uncoated rendering, plaster, metals, ceramics, stone, brickstone, glass, etc.

The coated substrate is advantageously dried, be it at room temperature or elevated temperatures depending on the solvent, which is optionally used.

By a corresponding selection of the hydrophobizing, hydrophilizing agents or mixtures thereof, the substrates can be made superhydrophobic providing a lotus effect to the substrate surface, or superhydrophilic providing super-wettability, and hydrophobicity/hydrophilicity may be controlled as desired by a corresponding mixture.

Thus, mixtures of pre-hydrophobized and pre-hydrophilized hedgehog shaped particles may be advantageously used, wherein, e.g. first discrete hydrophobic sites are formed combining to hydrophobic domains in a hydrophilic environment.

When the amount of hydrophobized particles exceeds the percolation threshold the system may have a lotus effect like roll-off of droplets while still maintaining hydrophilic sites which collect water by adsorption and allow for droplet growth to a given size where gravity forces overcome the adhesion forces.

By a suitable selection and mixture of hydrophobizing agents and hydrophilizing agents, contact angles may be achieved which are close to 0° up to 160°. For example, contact angles may be achieved from 2° to 145°, preferably from 7° to 140°, more preferably from 29° to 133°, especially from 34° to 127°, particularly from 44° to 110°, even more preferably from 48° to 100°, most preferably from 58° to 86°.

Accordingly, the use of the composition described above for controlling the wettability of a substrate is a further aspect of the present invention, as well as the use of the composition according to the invention in a coating formulation.

As a result, coatings may be tailor-made as to different wetting, dewetting, drop coalescence and other fluid interaction properties being useful in many applications such as protective coatings for packaging (paper, board, plastics, foil), wall-paper, wood, wood composites such as flake board, plastics, foil, concrete, coated or uncoated rendering, plaster, metals, ceramics, stone, brickstone, glass, etc.

Accordingly, a material comprising the above described composition is a final aspect of the invention, e.g. a material, which is selected from the group comprising paper, board, wall-paper, wood, wood composites such as flake board, plastics, foil, concrete, coated or uncoated rendering, plaster, metals, ceramics, stone, brickstone, glass, etc.

The following figures, examples and tests will illustrate the present invention, but are not intended to limit the invention in any way.

EXAMPLES

Figure 1A:
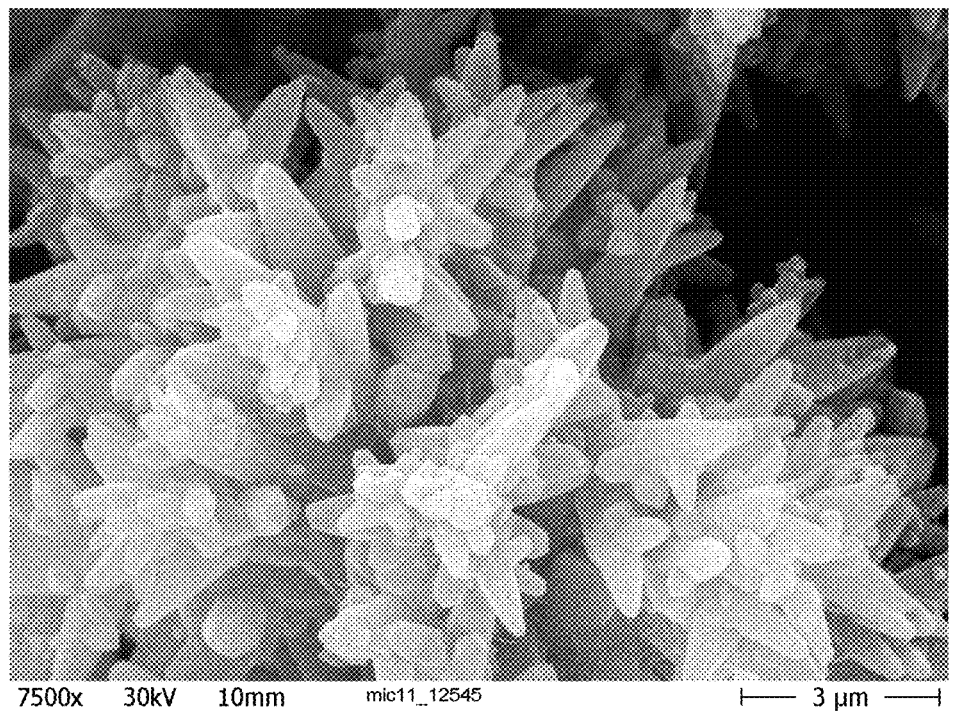
FIGS. 1a and 1b show SEM images of hedgehog shaped PCC particles to be used in the invention.
Figure 1B:
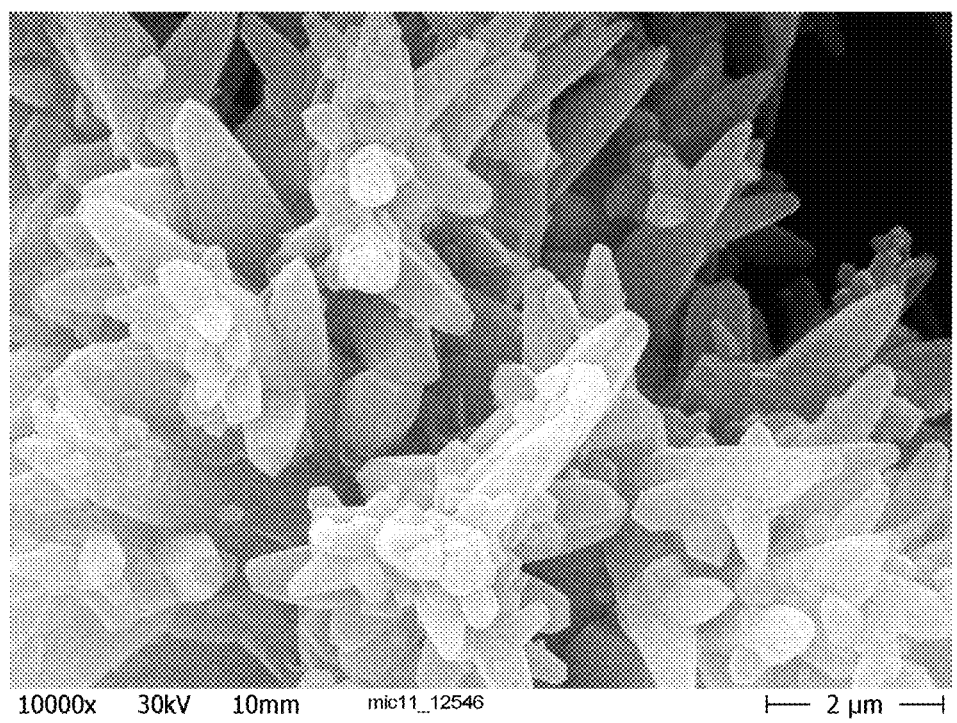

The following experiments were carried out for determining the properties of compositions according to the invention on the wetting of substrates. This is achieved by preparing coating formulations, applying the same on substrates, wetting the substrate surface, and subsequent measurement of the contact angles of the water droplets present on the substrate surface, wherein the contact angle is an indicator for hydrophobicity/hydrophilicity of a surface.

For this purpose, coating formulations of pre-hydrophobized, pre-hydrophilized and untreated hedgehog shaped PCCs as well as mixtures thereof were prepared, optionally comprising further components.

These coating formulations were applied to Synteape® foils and raw paper, and, after drying, and, in some cases, application of post-layers of hydrophobizing agent and other agents, the contact angle and/or wetting behaviour was determined.

Example 1

Pre-Treated Hedgehog Shaped Particles

1. Material
1.1. Laboratory Equipment and Methods of Measurement
For Coating the Substrates:
Erichsen Bar Coater K-Control-Coater K202, Model 624/Fabr. No. 57097-4/wire-wound rod No. 1//Belt dryer 7.0 mmin$^{-1}$/150° C.
Viscosity Measurement
All Brookfield-viscosities are measured with a Brookfield DV-II Viscometer equipped with a LV-3 spindle at a speed of 100 rpm and room temperature (20±3° C.).
Solids Content of an Aqueous Slurry
All mineral preparation solids content (also known as "dry weight") was measured using a Mettler Toledo HB 43-S Moisture Analyser.
For SEM Images:
RDS-ARM-MIC Lims: 220017
Scanning electron micrographs (SEM) were carried out by adjusting the solids content to a concentration of 20 wt % in water using an ultraturax (rotor-stator-mixer). A few drops (approximately 100 mg) were diluted in 250 ml distilled water and filtered through 0.2 μm pore membrane filter. Preparations obtained on the membrane filter in this way were sputtered with gold and evaluated in the SEM at various enlargements.
Regarding the SEM images of coatings, a sample of the coated substrate was sputtered with gold and evaluated in the SEM at various enlargements.
For Contact Angle Measurements:
For measuring the contact angle, 4 water drops of 5 μl each were applied on 4 Synteape® foils, a photograph was taken 120 s after application. The determination of the contact angle was carried out visually with the aid of the measuring module of the Image Access database Version 8 based on the photos made of the droplets, and an average value was calculated.

| | |
|---|---|
| Camera: | Canon EOS 5D Mark II |
| Objective: | Canon EF 100 mm f/2 8L Macro IS USMDDDD |
| Difference adjustment: | 0.3 m |
| Distance rings: | Kenko distance rings 12 + 24 + 36 mm |
| Tripod and illumination | Kaiser microdrive tripod + 2x Repro illumination equipment RB5055 HF |
| Release: | Canon remote control/Timer TC-80N3 |
| Data of recording: | |
| Brightness balance: | automatically |
| Lens opening: | lens opening adjustment 32 |
| Illumination time: | automatically |
| Release delay: | 120 s after drop application |
| Drop size: | 5 μl |

Figure 2A:
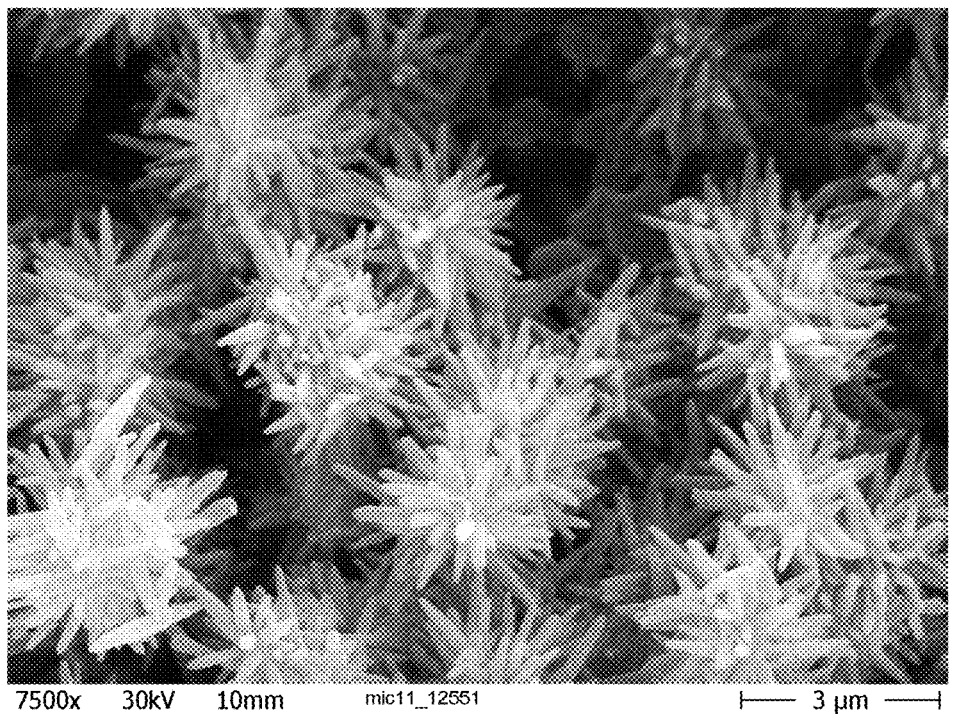
FIGS. 2a and 2b show SEM images of hedgehog shaped PCC particles to be used in the invention.
Figure 2B:
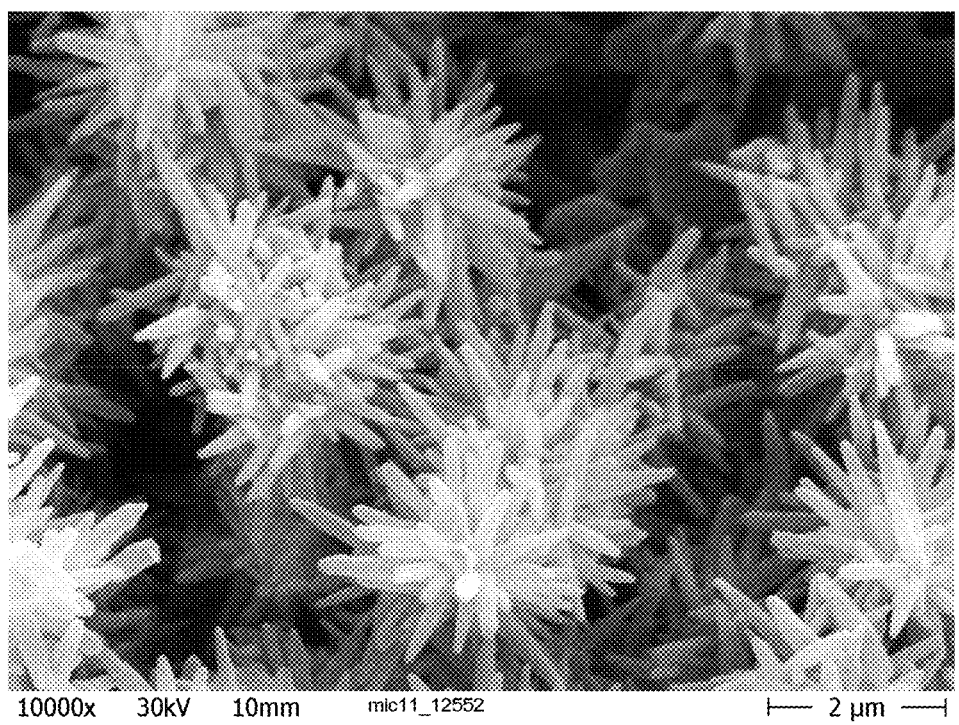

1.2. Raw Material
PCC 1: precipitated calcium carbonate; solids content 18 wt %; BET specific surface area: 2 m$^2$/g, $d_{50}$: 8 μm; calcite content>99%, the crystals having a clustered scalenohedral morphology (cf. FIGS. 1a and b)
PCC 2: precipitated calcium carbonate; solids content 14 wt %; BET specific surface area: 11.7 m$^2$/g (cf. FIGS. 2a and 2b)
PCC 2 was prepared as follows:
a) Stage 1: Seed Preparation
160 kg of quicklime CaO (e.g., the quicklime supplied by Mississippi Lime Co., Ste. Geneviéve, Mo.) was slaked by adding the compound to 1.300 litres of 50° C. tap water in a stirred reactor. The quicklime was slaked for 30 minutes under continuous stirring and the resulting slurry of calcium hydroxide ("milk of lime") was adjusted to 13% solids content via dilution with 60° C. water and was then screened on a 100 μm screen. Prior to the carbonation, 5.0 wt % percent of Sr(OH)$_2$.8H$_2$O (based on the dry weight of calcium hydroxide) was added to the milk of lime.

The aragonitic PCC seed precipitation was conducted in a 1 000 litre baffled cylindrical stainless steel reactor equipped with an gassing agitator, a stainless steel carbonation tube to direct a carbon dioxide/air gas stream to the impeller and probes for monitoring the pH and conductivity of the suspension. 800 litres of the calcium hydroxide suspension obtained in the slaking step above, adjusted to a temperature of 60° C., were added to the carbonating reactor. A gas of 6% by volume of CO$_2$ in air was then bubbled upwards through the slurry at a rate of 100 m$^3$/h for 15 minutes (calculated from start of introduction of the CO$_2$ gas) under a slurry agitation of 1 480 rpm. Thereafter, the CO$_2$ volume fraction in the gas was augmented to 24% and the gas flow rate was augmented to 200 m$^3$/h. The CO$_2$ volume fraction and gas flow rate were maintained at this rate until the end of the reaction. During the carbonation, the temperature of the reaction mix was not controlled and was allowed to rise due to the heat generated in the exothermic precipitation reaction. After conductivity reached a minimum corresponding to the total conversion of Ca(OH)$_2$ into PCC, the gassing was continued for another 8 minutes before the introduction of gas was stopped. Carbonation time, calculated from start of gas introduction to the time of minimum conductivity, was 84 minutes. The aragonitic PCC seed slurry was then screened on a 45 μm screen and the screened product was recovered as an aqueous slurry of the aragonitic PCC seed. The aragonitic seed carbonation with the addition of 5.0 wt % Sr(OH)$_2$.8H$_2$O yielded an aragonitic PCC seed slurry having 96.1% aragonite.

The aragonitic PCC seed slurry was submitted to post processing by dewatering and grinding it to yield particles having an SSA of 20.6 m$^2$/g and a weight median diameter of 0.22 μm.
b) Stage 2: Manufacturing of Final Aragonitic PCC2
Slaking and carbonation were performed in the same manner as described above in Stage 1, except that no Sr(OH)$_2$.8H$_2$O was added and 2.5% weight percent (calculated as dry calcium carbonate based on dry weight of calcium hydroxide) of the ground aragonitic PCC seeds formed in Stage 1 was added to the milk of lime prior to carbonation. Testing conducted on the final aragonitic PCC product indicated that 77.6 wt % of the product was of the aragonitic crystal form. In addition, post processing was conducted, as described in Stage 1 above, to yield particles having an SSA of 11.7 m$^2$/g and a median diameter of 0.41 μm. Subsequently, an aqueous slurry was prepared having a solids content of 14 wt %. The hedgehog particle form of PCC2 can be perfectly seen in FIGS. 2a and 2b.
Hydrophobizing Agents:
Blend of palmitic acid and stearic acid (weight ratio: 1:1) (30 wt % in 95% ethanol): 0.4 g/100 g (0.4 pph) (slightly coated) and 1.9 g/100 g (1.9 pph) (highly coated) based on the weight of PCC
Hydrophilizing agents:
Polymer solution of 0.33 wt % partially neutralized polyacrylic acid with a mass weight of 12 000 g/mol and a polydispersity D (Mw/Mn) of about 3, wherein about 50 mole % of the carboxylic groups are neutralized with Na$^+$ ions; and 0.17 wt % NaH$_2$PO$_4$; 0.5 g/100 g (0.5 pph) based on the weight of PCC K4-HEDP (potassium salt of hydroxy ethane-1,1-diphosphonic acid); solids content 55 wt %; prepared under stirring by adding potassium hydroxide to HEDP until a pH of 12 is reached:
Potassium hyroxide (SIGMA-Aldrich Art.No.: 60370)
HEDP (hydroxy ethane-1,1-diphosphonic acid; solids content 60 wt %, CF Budenheim; trade name Budex 5120)
Al(OH)$_3$-HEDP (aluminium hydroxide / hydroxy ethane-1,1-diphosphonic acid chelate; weight ratio 1:5); solids content 53 wt %; prepared under stirring by adding aluminium hydroxide to HEDP in a weight ratio of 1:5 at room temperature until a homogeneous mixture is obtained; subsequently heating to up to 90° C. for 1 h until chelate solution is obtained)
Al(OH)$_3$, Martinswerk (ALBEMARLE corporation), MARTIFIN OL-107
HEDP (hydroxy ethane-1,1-diphosphonic acid; solids content 60 wt %, CF Budenheim; trade name Budex 5120)
  Binders
Acronal® S360D (styrene-acrylic latex); solids content 50 wt %, BASF Art.: 50005 562
Hycar 1562X117 Emulsion (medium acrylonitril; polar latex); solids content 41.4 wt %, Emerald Performance Materials
PVA BF 05 (Polyvinylalcohol) Chang Chun Petrochemicals Taiwan diluted in cooking water and cooled down, solids content 18 wt %
Linseed oil, Aldrich Art. Nr. 430021-250 ML
Post-Layer Treating Agents
GE Bayer Release Agent M: (siliconizing agent)
Stearic acid solution (saturated in 95% ethanol at room temperature (20±3° C.).
  Substrate:
YUPO (Synteape®)/Art.: 675227, white half-matt PP 18×26 (468 cm$^2$); 62 g/m$^2$
Raw paper: Sappi Magno matt classic 18×26 (468 cm$^2$) 82 g/m$^2$
  2. Methods
  2.1. Sample Preparation
  2.1.1 Pre-Treated Hydrophobized Particles
  4 000 g of the repective PCC slurries were heated up to 80° C. and a blend of palmitic acid and stearic acid (weight ratio: 1:1) diluted in warm 95% ethanol (about 50° C.) was added during 10 minutes. The mixture was stirred for 1 h at 80° C. in a 5 litre double wall steel vessel fitted with viscojet stirrer and thermostat for temperature control. After cooling down, the slurries were dried in an oven for 15 h at 120° C.
  2.1.2. Pre-Treated Hydrophilized Particles
  To 8 000 g of the respective PCC slurries 0.5 pph of the afore-mentioned polymer solution of partially neutralized polyacrylic acid were added during 10 minutes. The mixture was stirred for 1 h at room temperature in a 10 litre plastic bucket. The slurries were dried in an oven for 15 h at 120° C.
  2.1.3. Coating Formulations
  The coating formulations were produced by adding the pre-hydrophobized and/or pre-hydrophilized PCC particles in portions, as well as optionally further components such as further hydrophilizing agents (as indicated below) to a mixture (ideally a solution) of the respective binder in tap water under stirring in a VMA Dispermat® (VMA-Getzmann GmbH, Reichshof, Germany) with a 70 mm dispersing disk, and subsequently stirring the mixture for 1 hour. The coating formulations were screened over a small tea-sieve having a screen size of 500 nm, and viscosity and solids content were determined (cf. tables 1 to 5)

All coating formulations showed thixotropic and settling properties. All coating formulations containing hydrophobic particles showed anti-wetting properties.

The coating formulations were coated on an impermeable plastic substrate (Synteape®) (two papers per colour) and raw paper for samples 20 (raw) and 21 (raw). On the Synteape° foils, the formulations were applied, pre-dried 3 times under a 150° C. heater via a rolling conveyor belt and post dried 24 h at room temperature. The resulting film thickness was from 0.1 to 0.3 mg/cm$^2$.

2.1.4. Post-Layer

For verifying the impact of post-layering, sample 1 was post-treated by applying silicone post-layer on top of the PCC coating after drying. This was carried out by means of a commercial spray agent by applying for 3 seconds the spray mist onto the coated composition surface. Thus, 1 (sample 22S1), 2 (sample 22S2), and 3 (sample 22S3) silicone post-layers, respectively, were formed on top of the PCC coating.

TABLE 1

Mixtures of pre-hydrophobized and pre-hydrophilized PCC 1

|  | Sample 1 | Sample 2 | Sample 3 | Sample 4 |
| --- | --- | --- | --- | --- |
| Hydrophobized PCC 1 (dry) (0.4 pph) | 190.5 g | 133.3 g | 57.1 g | — |
| Hydrophilized PCC 1 (dry) | — | 57.1 g | 133.2 g | 190.5 g |
| Acronal S 360 D | 19.0 g | 19.0 g | 19.0 g | 19.0 g |
| Tap water | 290.5 g | 290.5 g | 290.5 g | 290.5 g |
| Total | 500.0 g | 500.0 g | 500.0 g | 500.0 g |
| Viscosity mPa · s/100 rpm | 130 | 102 | 160 | 152 |
| Final solids content, wt % | 38.9 | 37.9 | 39.6 | 39.8 |

TABLE 2

Mixtures of highly coated pre-hydrophobized and pre-hydrophilized PCC 2, and additional hydrophilizing agents

|  | Sample 5 | Sample 6 | Sample 7 | Sample 8 |
| --- | --- | --- | --- | --- |
| Hydrophobized PCC 2 (dry) (1.9 pph) | 94.1 g | 85.8 g | 36.8 g | — |
| Hydrophilized PCC 2 (dry) | — | 36.8 g | 85.8 g | 122.5 g |
| Acronal S 360 D | 9.4 g | 12.3 g | 12.3 g | 12.3 g |
| Tap water | 294.3 g | 362.8 g | 362.7 g | 362.8 g |
| K4-HEDP, 55% | 2.0 g | 2.2 g | 2.2 g | 2.2 g |
| Al(OH)$_3$-HEDP, 53% | 0.2 g | 0.2 g | 0.2 g | 0.2 g |
| Total | 400.0 g | 500.0 g | 500.0 g | 500.0 g |
| Viscosity mPa · s/100 rpm | 340 | 170 | 130 | 121 |
| Final solids content, wt % | 24.9 | 24.9 | 24.8 | 25.3 |

TABLE 3

Mixtures of slightly coated pre-hydrophobized and pre-hydrophilized PCC 2, and additional hydrophilizing agents

|  | Sample 9 | Sample 10 | Sample 11 | Sample 12 |
| --- | --- | --- | --- | --- |
| Hydrophobized PCC 2 (dry) (0.4 pph) | 151.9 g | 86.0 g | 36.9 g | — |
| Hydrophilized PCC 2 (dry) | — | 36.9 g | 86.0 g | 122.9 g |

TABLE 3-continued

Mixtures of slightly coated pre-hydrophobized and pre-hydrophilized PCC 2, and additional hydrophilizing agents

|  | Sample 9 | Sample 10 | Sample 11 | Sample 12 |
|---|---|---|---|---|
| Acronal S 360 D | 15.2 g | 12.3 g | 12.3 g | 12.3 g |
| Tap water | 561.1 g | 363.0 g | 363.0 g | 363.0 g |
| K4-HEDP, 55% | 1.6 g | 1.6 g | 1.6 g | 1.6 g |
| Al(OH)$_3$-HEDP, 53% | 0.2 g | 0.2 g | 0.2 g | 0.2 g |
| Total | 730.0 g | 500.0 g | 500.0 g | 500.0 g |
| Viscosity mPa·s/100 rpm | 110 | 130 | 130 | 127 |
| Final solids content, wt % | 21.9 | 26.0 | 26.0 | 26.0 |

TABLE 4

Different binders used with pre-hydrophilized PCC1

|  | Sample 13 | Sample 14 | Sample 15 | Sample 16 |
|---|---|---|---|---|
| Hydrophilized PCC 1 (dry) | 152.0 g | 145.5 g | 142.9 g | 136.5 g |
| Hycar, 41.4 wt % | 18.4 g | 35.1 g | — | — |
| PVA, 15 wt % | — | — | 49.3 g | 94.1 g |
| Tap water | 249.6 g | 319.4 g | 182.9 g | 164.4 g |
| Total | 420.0 g | 500.0 g | 275.0 g | 395.0 g |
| Viscosity mPa·s/100 rpm | 177 | 177 | 719 | 388 |
| Final solids content, wt % | 37.4 | 31.4 | 39.5 | 38.1 |

TABLE 5

Different PCCs in the presence of further hydrophilizing agents

|  | Sample 17 | Sample 18 | Sample 19 | Sample 20 | Sample 21 |
|---|---|---|---|---|---|
| Hydrophilized PCC 1 (dry) | 73.5 g | — | — | — | — |
| Hydrophobized PCC 1 (dry) | — | — | — | — | 10.0 g |
| Hydrophobized PCC 2 (dry) (1.9 pph) | — | 10.4 g | 10.4 g | 10.0 g | — |
| Acronal S 360 D | — | — | — | — | — |
| Linseed oil | — | — | — | 20.0 g | 20.0 g |
| K4-HEDP | 1.3 g | — | — | — | — |
| Al(OH)$_3$-HEDP | 0.1 g | — | — | — | — |
| PVA, 18 wt % | 20.1 g | 69.6 g | 69.6 g | — | — |
| Tap water | 205.0 g | — | 120.0 g | — | — |
| Total | 300.0 g | 80.0 g | 200.0 g | 30.0 g | 30.0 g |
| Viscosity mPa·s/100 rpm | 102 | | | | |
| Final solids content, wt % | 25.2 | 24.1 | 10.6 | | |

2.2. Determination of the Contact Angle

For determining the contact angle, water drops of 5 µl each were applied on the coated Synteape® foils. The drops thus formed were photographed and the contact angle was determined with the aid of the measuring module of the Image Access database Image Access Version 8. The below listed contact angles are an average of several measurements of the same setup.

TABLE 6

Coated sheets and wetting contact angles

| Sample | Coating/sheet (sheet 1) [mg] | Coating/sheet (sheet 1) [mg/cm$^2$] | Coating/sheet (sheet 2) [mg] | Coating/sheet (sheet 2) [mg/cm$^2$] | Weight ratio Hydro-phob./Hydro-phil. PCC | Average contact angle [°] | Std. deviation [°] |
|---|---|---|---|---|---|---|---|
| 1 | 148.8 | 0.3 | 115.6 | 0.3 | 100:0 | 139 | 9 |
| 2 | 129.8 | 0.3 | 110.7 | 0.3 | 70:30 | 112 | 4 |
| 3 | 133.4 | 0.3 | 163.2 | 0.3 | 30:70 | 107 | 10 |
| 4 | 140.2 | 0.3 | 86.8 | 0.2 | 0:100 | 102 | 2 |
| 5 | 59.8 | 0.2 | 49.2 | 0.2 | 100:0 | 100 | 4 |
| 6 | 45.9 | 0.2 | 37.5 | 0.2 | 70:30 | 67 | 3 |
| 7 | 50.3 | 0.2 | 51.3 | 0.2 | 30:70 | 61 | 9 |
| 8 | 56.8 | 0.2 | 51.4 | 0.2 | 0:100 | 44 | 8 |
| 9 | 38.6 | 0.1 | 42.7 | 0.2 | 100:0 | 102 | 2 |
| 10 | 50.7 | 0.1 | 55.7 | 0.2 | 70:30 | 58 | 9 |
| 11 | 62.5 | 0.2 | 60.0 | 0.2 | 30:70 | 44 | 9 |
| 12 | 66.0 | 0.2 | 54.3 | 0.2 | 0:100 | 29 | 7 |
| 13 | 70.5 | 0.3 | 84.6 | 0.3 | 0:100 | 86 | 2 |
| 14 | 85.5 | 0.3 | 72.8 | 0.3 | 0:100 | 81 | 4 |
| 15 | 115.8 | 0.3 | 105.1 | 0.3 | 0:100 | 48 | 11 |
| 16 | 134.2 | 0.3 | 113.4 | 0.3 | 0:100 | 30 | 8 |
| 17 | 205.3 | 0.7 | 197.0 | 0.7 | 0:100 | 7 | 1 |
| 18 | 300.5 | 0.8 | 332.5 | 0.8 | 100:0 | 46 | 3 |
| 19 | 158.2 | 0.5 | 157.6 | 0.5 | 100:0 | 34 | 3 |
| 20 | 472.5 | 1.5 | 405.5 | 1.3 | 100:0 | 88 | 2 |
| 20 raw | — | — | — | — | 100:0 | 110 | 3 |
| 21 | — | — | — | — | 100:0 | 85 | 2 |
| 21 raw | — | — | — | — | 100:0 | 103 | 3 |
| 22S1 | — | — | — | — | 100:0 | 132 | 2 |
| 22S2 | — | — | — | — | 100:0 | 133 | 5 |
| 22S3 | — | — | — | — | 100:0 | 130 | 4 |

As can be taken from the above contact angles, it is possible to control accurately the hydrophobicity/hydrophilicity of substrate surfaces by tailor-made coatings using hedge-hog shaped PCC according to the invention.

Figure 4:
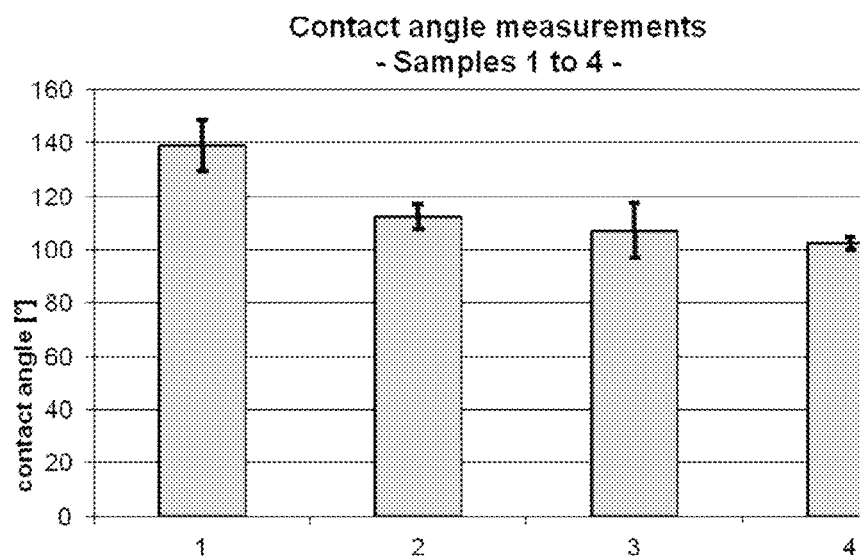
FIG. 4 shows contact angles of substrates coated with different samples of pre-hydrophobized and/or pre-hydrophilized hedgehog shaped particles according to the invention.

As can be seen from samples 1 to 4, the contact angle, and thus the hydrophobicity of the substrate surface can be accurately adjusted by mixing hydrophobized and hydrophilized hedgehog shaped PCC (cf. FIG. 4).

Figure 5:
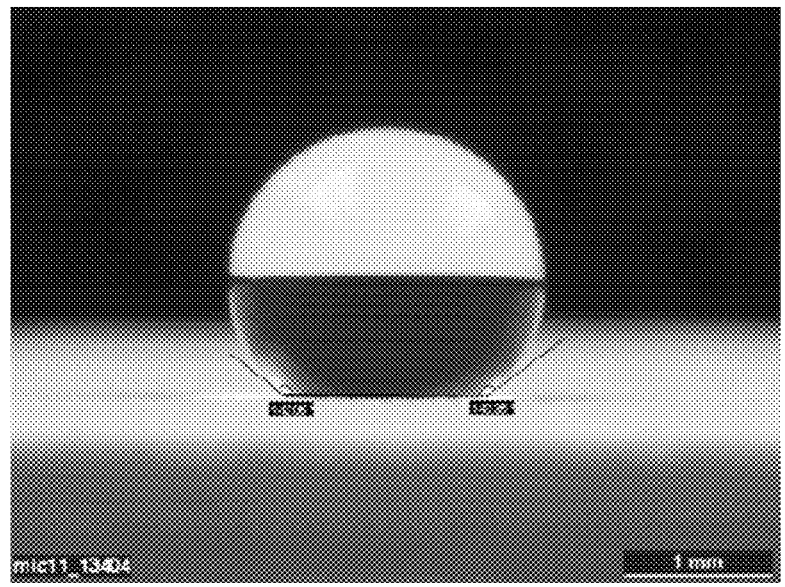
FIG. 5 shows a photograph of a droplet on a substrate being coated with a coating formulation according to the invention having a high contact angle.

The high contact angle of sample 1 is illustrated by FIG. 5.

Figure 6:
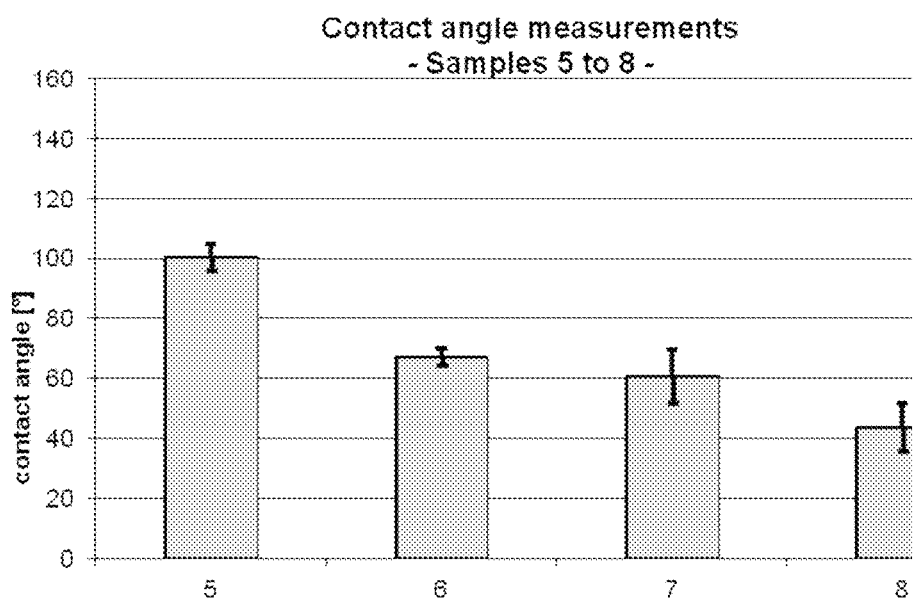
FIG. 6 shows contact angles of substrates coated with different samples of highly coated pre-hydrophobized and/or pre-hydrophilized hedgehog shaped particles according to the invention, as well as additional hydrophilizing agents.

The same applies to samples 5 to 8 using a slightly different particle form. Also, in these tests, the contact angle, and thus the hydrophobicity of the substrate surface can be accurately adjusted by mixing hydrophobized and hydrophilized hedgehog shaped PCC. Furthermore, as can be taken from these samples, by admixing further hydrophilizing agents, it is possible to lower the hydrophobicity as desired reflected by lower contact angles (cf. FIG. 6)

Figure 7:
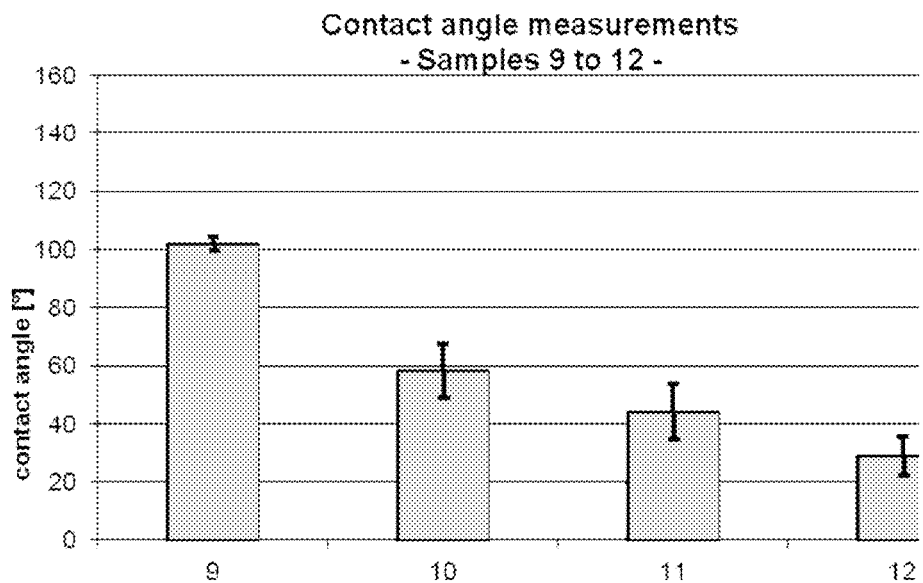
FIG. 7 shows contact angles of substrates coated with different samples of slightly coated pre-hydrophobized and/or pre-hydrophilized hedgehog shaped particles according to the invention, as well as additional hydrophilizing agents.

As can be taken from the results of samples 9 to 12, being essentially identical with samples 5 to 8 apart from the fact that the hydrophobized PCC comprises less hydrophobizing agent, the effects can already be observed at a rather low amount of hydrophobizing agent (cf. FIG. 7)

Figure 8:
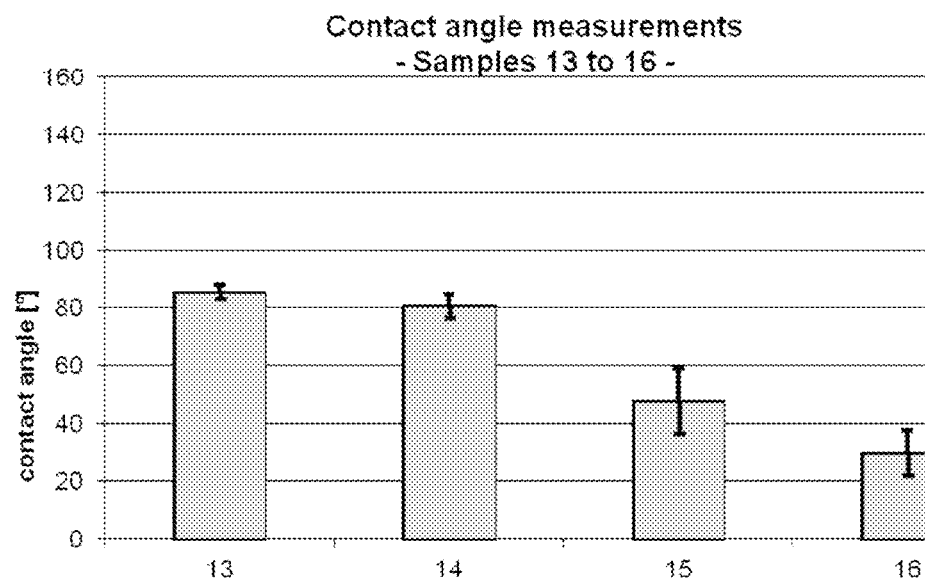
FIG. 8 shows contact angles of substrates coated with different samples of pre-hydrophilized hedgehog shaped particles and different binders.

In samples 13 to 16, the influence of different binders was evaluated, and it was found that also by using different binders the hydrophilic properties can be further controlled. Thus, with the same kind of hydrophilized PCC, hydrophilicity can be increased by using Hycar instead of Acronal, and can be even more increased by using PVA (cf. FIG. 8)

Figure 9:
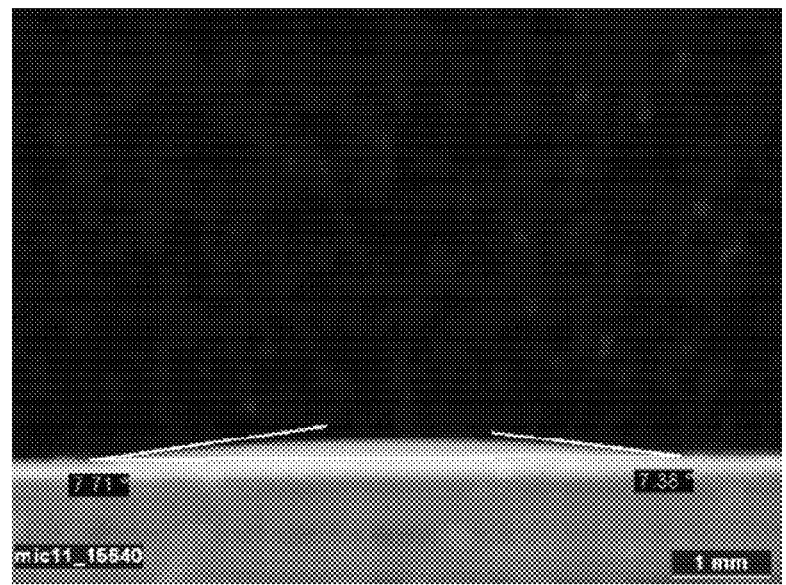
FIG. 9 shows a photograph of a droplet on a substrate having been coated with a coating formulation according to the invention having a low contact angle.

As can be taken from the results of sample 17, this effect can even be increased by adding further hydrophilizing agents leading to a nearly complete wetting of the substrate surface. The low contact angle of sample 17 is illustrated by FIG. 9.

Figure 10:
FIG. 10 shows contact angles of substrates coated with different samples of pre-hydrophobized and pre-hydrophilized hedgehog shaped particles according to the invention, as well as additional hydrophilizing agents and binders.

The influence of different binders on hydrophobized PCC can be taken from the results of samples 18 to 21. Thus, PVA decreases hydrophobicity compared with Acronal, wherein the effect is dependent on the amount of water in the coating formulation. In this respect, it was also shown that the control of hydrophobicity is not only possible with aqueous formulations, but also in oil-based formulations such as those based on linseed oil (cf. samples 20 and 21) providing comparable effects (cf. FIG. 10).

Furthermore, looking at the contact angles of samples 20 and 21 on Synteape® foil and raw paper, it can be seen that a higher contact angle, i.e. increased hydrophobicity can be obtained on raw paper.

Figure 11:
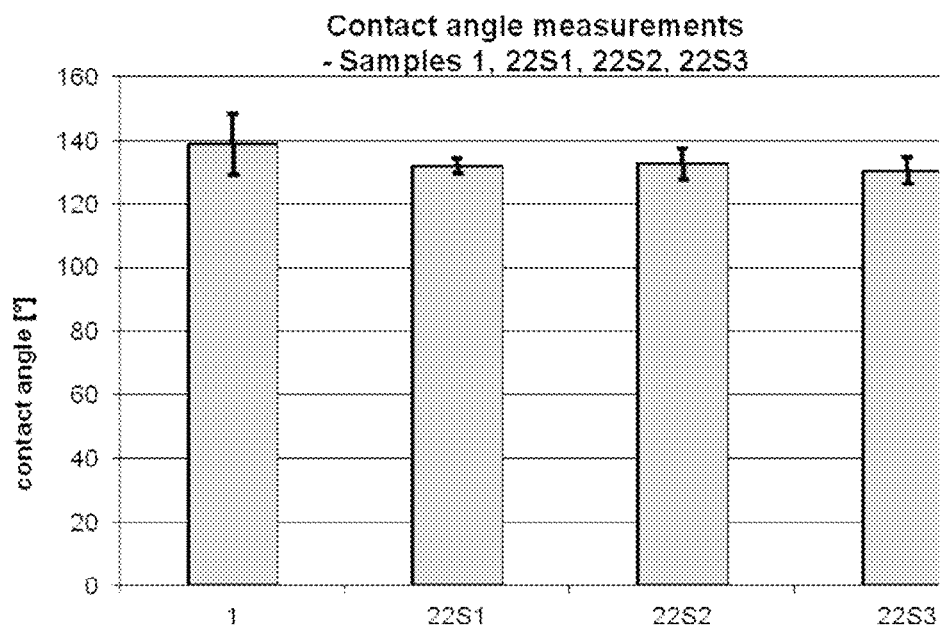
FIG. 11 shows contact angles of substrates coated with different samples of pre-hydrophobized hedgehog shaped particles in combination with silicone post-layers.
Figure 12:
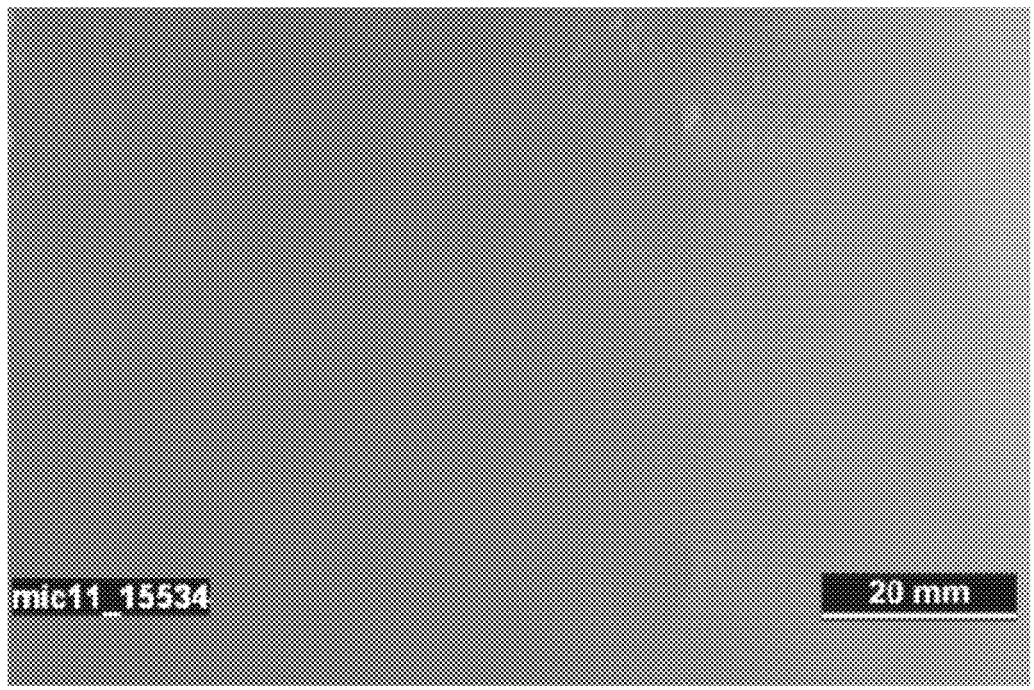
FIG. 12 shows a photograph illustrating the wetting behaviour of substrates coated with pre-hydrophilized hedgehog shaped particles.
Figure 13:
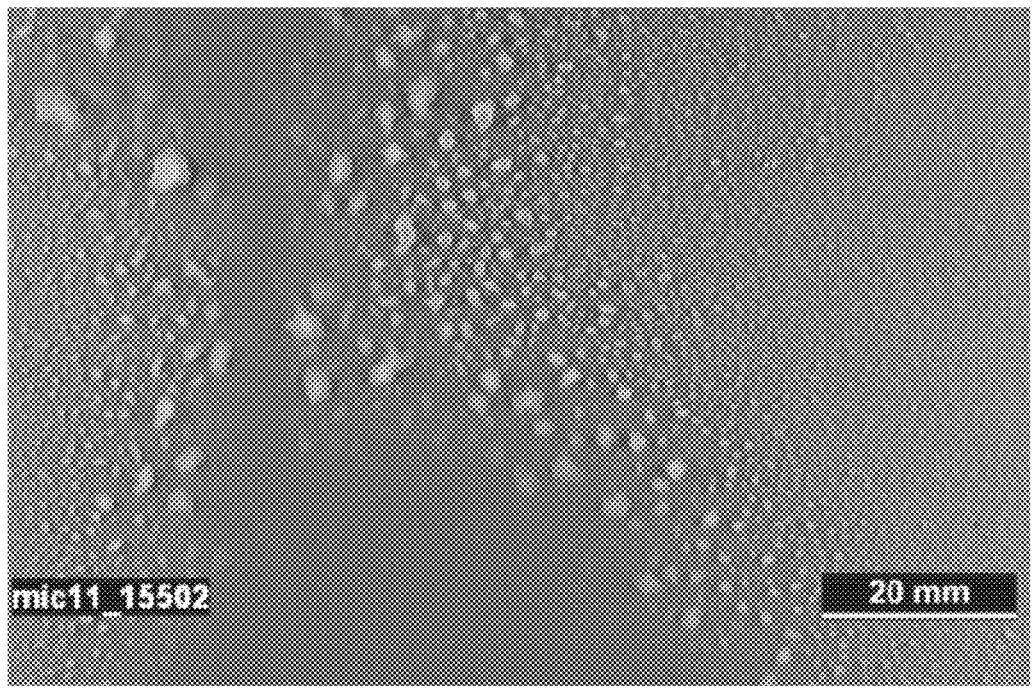
FIG. 13 shows a photograph illustrating the wetting behaviour of substrates coated with pre-hydrophobized hedgehog shaped particles.
Figure 14:
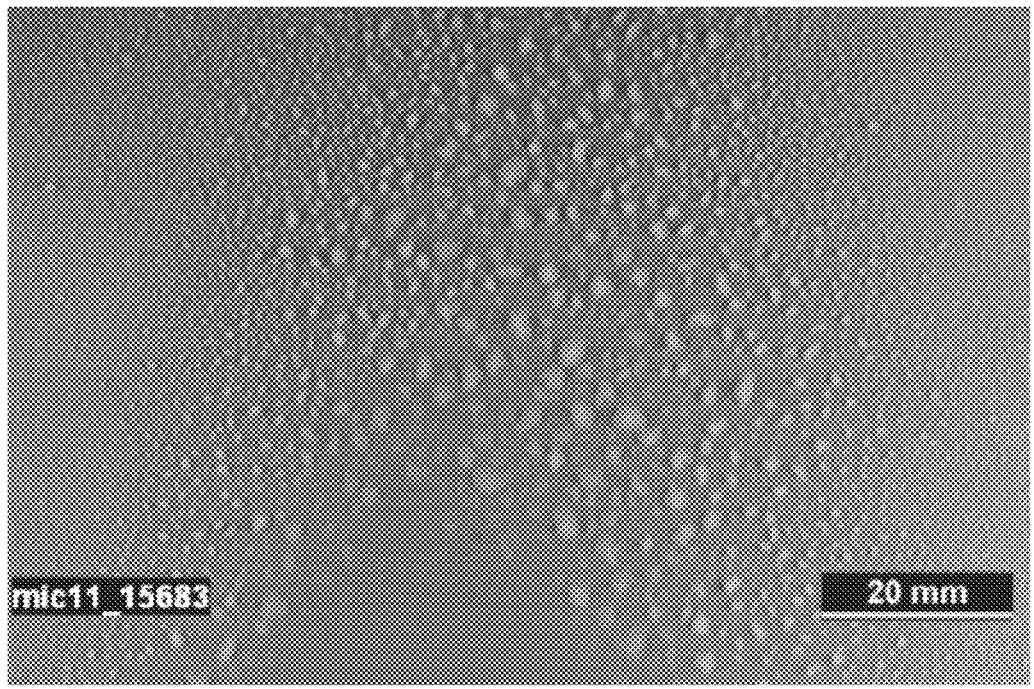
FIG. 14 shows a photograph illustrating the wetting behaviour of substrates coated with pre-hydrophobized hedgehog shaped particles and two silicone post-layers.
Figure 15:
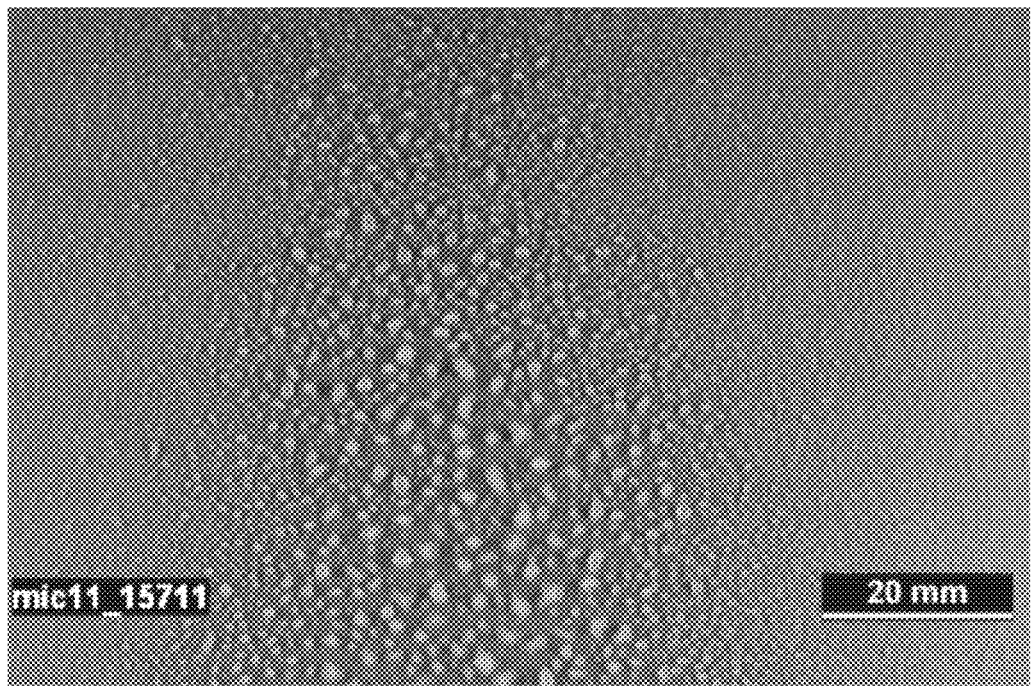
FIG. 15 shows a photograph illustrating the wetting behaviour of substrates coated with pre-hydrophobized hedgehog shaped particles and three silicone post-layers.

In samples 22S1, 22S2, 22S3, the influence of a silicone post-layer was verified. For this purpose a coating of sample 1 was one to three times coated with silicone post-layers. The results show that the high hydrophobization degree of sample 1 is essentially equal with the siliconized samples (cf. FIG. 11)

2. 3. Wetting

For investigating the wetting behaviour, especially the wetting behaviour with finely divided water droplets simulating mist or dew, sheets coated with samples 1, 12, 22S2 and 22S3 were mounted on a metal panel. Deionized water was applied by a micro diffuser. After each stroke a picture of the sheet was made and the weight of the applied deionized water was measured. From table 7, the amounts of applied deionized water can be taken.

TABLE 7

| Stroke No. | Sample 1 [g] | Sample 12 [g] | Sample 22S2 [g] | Sample 22S3 [g] |
|---|---|---|---|---|
| 0 | 0.000 | 0.000 | 0.000 | 0.000 |
| 1 | 0.327 | 0.375 | 0.256 | 0.483 |
| 2 | 0.756 | 0.807 | 0.668 | 0.889 |
| 3 | 1.253 | 1.143 | 1.185 | 1.240 |
| 4 | 1.783 | 1.467 | 1.643 | 1.759 |
| 5 | 2.277 | 1.758 | 2.022 | 2.152 |
| 6 | 2.753 | 2.110 | 2.520 | 2.623 |
| 7 | 3.546 | 2.480 | 3.064 | 3.090 |
| 8 | 3.528 | 2.796 | 3.599 | 3.555 |
| 9 | 3.970 | 3.120 | 4.359 | 4.005 |
| 10 | 4.411 | 3.421 | 4.941 | 4.516 |
| 11 | 4.797 | 3.685 | 5.491 | 4.956 |
| 12 | 5.271 | 3.950 | 6.022 | 5.468 |
| 13 | 5.767 | 4.209 | 6.556 | 5.983 |
| 14 | 6.178 | 4.607 | 7.044 | 6.492 |
| 15 | 6.677 | 5.039 | 7.577 | 6.959 |
| 16 | 7.129 | 5.461 | 8.006 | 7.393 |
| 17 | 7.639 | 5.944 | 8.422 | 7.920 |
| 18 | 7.992 | 6.355 | 8.859 | 8.363 |
| 19 | 8.366 | 6.799 | 9.325 | 8.879 |
| 20 | 8.740 | 7.200 | 9.828 | 9.323 |
| 21 | 9.129 | 7.701 | 10.253 | 9.874 |
| 22 | 9.466 | 8.149 | 10.731 | 10.366 |
| 23 | 9.870 | 8.636 | 11.185 | 10.970 |
| 24 | 10.143 | 9.275 | 11.609 | 11.529 |
| 25 | 10.542 | 9.776 | 12.090 | 11.987 |

From the images shown in FIGS. 12 to 15 clearly the wetting (superwetting) behaviour of hydrophilized PCC sample 12 promoting a film wetting and disabling drop formation can be seen compared to samples 1, 22S2 and 22S3, showing repellent/superhydrophobic behaviour promoting drop formation and drop roll-off, wherein any one of these samples were sprayed with the same amount of water of about 5 g as can be taken from table 7 (bold amounts reflect the samples illustrated by FIGS. 12 to 15).

Example 2

Untreated Hedgehog Shaped Particles

In Example 2, instead of pre-hydrophobizing/pre-hydropilizing the hegdehog shaped particles, the untreated particles were combined with the corresponding hydrophilizing and/or hydrophobizing agents upon preparation of the coating formulation only, and/or by ways of one or several post-layers.

1. Material
1.1. Laboratory Equipment and Measurement Methods
For Coating the Substrates:
Erichsen Bar Coater K-Control-Coater K202, Model 624/Fabr. No. 57097-4/coating rods 1-5 (control of the liquid flow)//Belt dryer 7.0 mmin$^{-1}$/150° C.
Spraying
Eco Spray Microdiffusor, Labo Chimie
Solids Content of an Aqueous Slurry
All mineral preparation solids contents (also known as "dry weight") were measured using a Mettler Toledo HB 43-S Moisture Analyser.
For SEM Images:
RDS-ARM-MIC Lims: 220017
Scanning electron micrographs (SEM) were carried out by adjusting the solids content to a concentration of 20 wt % in water using an ultraturax (rotor-stator-mixer). A few drops (approximately 100 mg) were diluted in 250 ml distilled water and filtered through 0.2 μm pore membrane filter.

Preparations obtained on the membrane filter in this way were sputtered with gold and evaluated in the SEM at various enlargements.

For Contact Angle Measurements:

| | |
|---|---|
| Camera: | Canon EOS 5D Mark II |
| Objective: | Canon EF 100 mm f/2 8L Macro IS USMDDDD |
| Difference adjustment: | 0.3 m |
| Distance rings: | Kenko distance rings 12 + 24 + 36 mm |
| Tripod and illumination | Kaiser microdrive tripod + 2x Repro illumination equipment RB5055 HF |
| Release: | Canon remote control/Timer TC-80N3 |
| Data of recording: | |
| Brightness balance: | automatically |
| Lens opening: | lens opening adjustment 32 |
| Illumination time: | automatically |
| Release delay: | 120 s after drop application |
| Drop size: | 5 µl |

1.2. Raw Material

PCC 2: precipitated calcium carbonate; solids content 14 wt %; BET specific surface area: 11.7 $m^2/g$; prepared as described above (cf. FIGS. 2a and 2b)

Figure 3A:
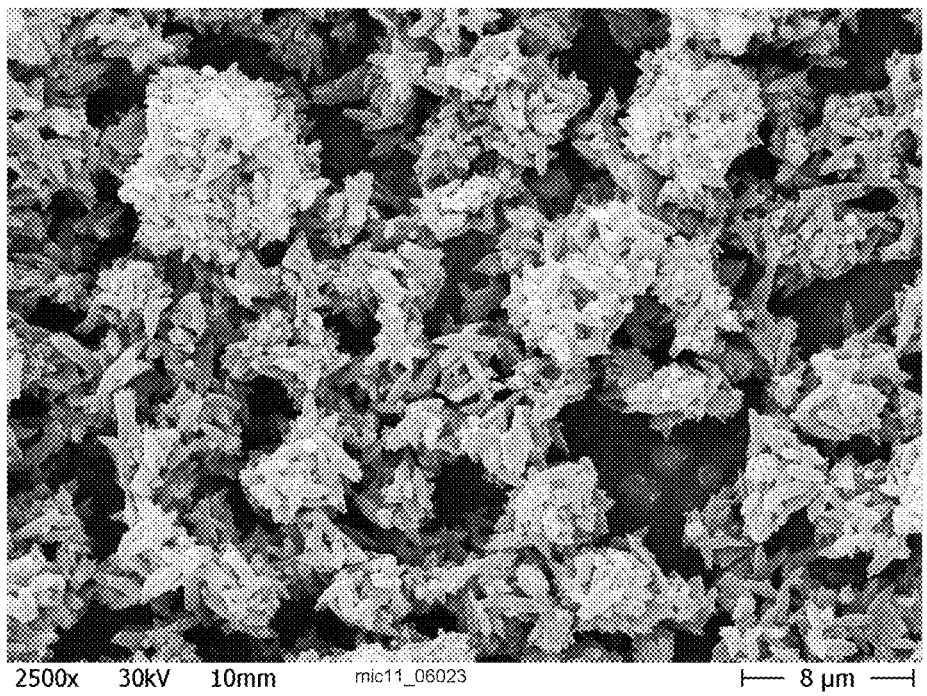
FIGS. 3a and 3b show SEM images of hedgehog shaped PCC particles to be used in the invention.
Figure 3B:
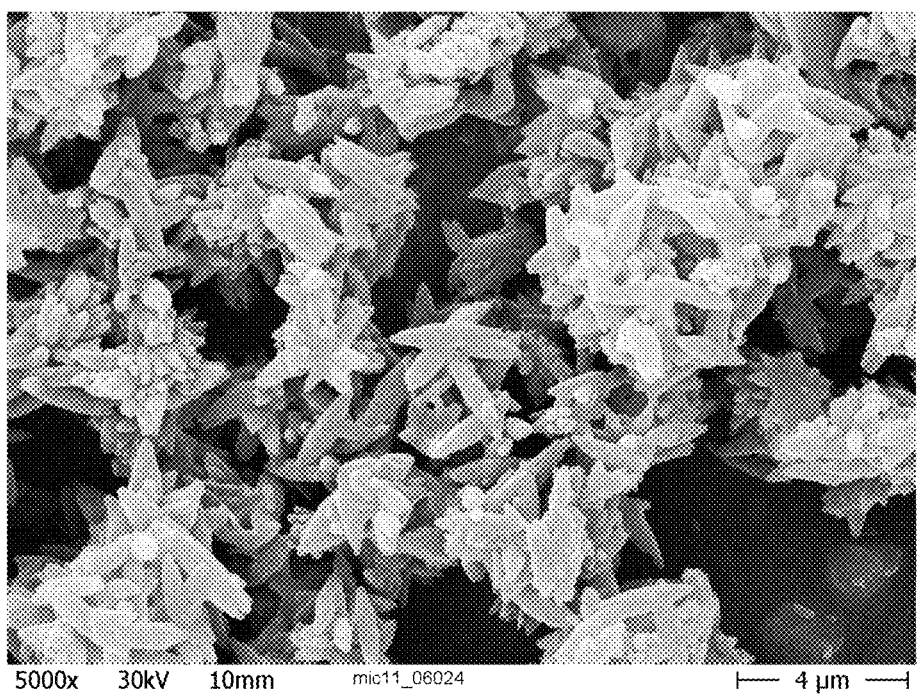

PCC 3: precipitated calcium carbonate Omya Syncarb® (available from Omya AG, Switzerland); solids content: 14 wt %; BET specific surface area: 3.5-6.5 $m^2/g$ (cf. FIGS. 3a and 3b)

Hydrophobizing Agents:

ASA Nalsize 7541 (Alkyl succinic anhydride); solids content 22.29 wt %, Ondeo Nalco Co.

AKD DR28XL (alkylketene dimer); solids content 23.9 wt %, Eka Chemicals

Stearic acid, Sigma S4751-100G

Wükoseal® 805; solids content 40 wt %; Süddeutsche Emulsions-Chemie GmbH (SEC), Mannheim-Neckarau, Germany Silres BS 1306 (polysiloxane modified with functional silicone resin), solids content 55 wt %; Wacker Chemie AG Binders Acronal® S360D (styrene-acrylic latex) solids content 50 wt %, BASF Art.: 50005 562 Substrate:

YUPO (Synteape®)/Art.: 675227, white half-matt PP 18×26 (468 $cm^2$); 62 $g/m^2$ 2. Methods 2.1. Sample Preparation With the below samples given in tables 8 and 9, several embodiments of the invention were verified:

a) Samples 23 to 26 (PCC2) and 28 to 29 (PCC3): Combination of hedgehog shaped particles with the binder and the hydrophobizing agent in order to obtain a corresponding coating formulation b) Samples 26 SA1 (PCC2), 26 SA2 (PCC2), 28 SA (PCC3) and 29 SA (PCC3): Combination of sample 26 comprising hedgehog shaped particles, binder and hydrophobizing agent with additional hydrophobizing agent in the form of one to two post-layers of stearic acid after having coated it onto the substrate.

c) Samples 27 SA (PCC3): Combination of hedgehog shaped particles and binder, whereas the hydrophobizing agent is combined with this mixture in the form of a post-layer of stearic acid after having coated it onto the substrate.

TABLE 8

| | Sample 23 | Sample 24 | Sample 25 | Sample 26 |
|---|---|---|---|---|
| PCC 2 (dry) | 238.5 g | 242.1 g | 249.6 g | 236.0 g |
| Acronal S360D | 6.9 g | 7.0 g | 7.0 g | 6.8 g |

TABLE 8-continued

| | Sample 23 | Sample 24 | Sample 25 | Sample 26 |
|---|---|---|---|---|
| AKD Eka DR 28 XL | 5.8 g | — | — | 5.7 g |
| Wükoseal 805 | — | 0.9 g | — | 0.9 g |
| Silres BS 1306 | — | — | 0.6 g | 0.6 g |
| Tap water | 148.8 g | 150.0 g | 211.8 g | 150.0 g |
| Total weight | 400.0 g | 300.0 g | 460.0 g | 400.0 g |
| Final solids content, wt % | 18.5 | 18..0 | 15.7 | 18.8 |

TABLE 9

| Material | Sample 27 | Sample 28 | Sample 29 |
|---|---|---|---|
| PCC 3 (dry) | 82.8 g | 82.2 g | 44.3 g |
| Acronal S360D | 3.1 g | 3.1 g | 1.7 g |
| AKD Eka DR 28 XL | — | 2.6 g | — |
| ASA Nalsize | — | — | 1.5 g |
| Tap water | 14.1 g | 12.1 g | 2.5 g |
| Total weight | 100.0 g | 100.0 g | 100.0 g |
| Final solids content, wt % | 33.2 wt % | 33.6 wt % | 36.2 wt % |

The coating formulations were prepared by adding PCC2 or PCC3, respectively, as well as the hydrophobizing agents (if present), in portions, to a mixture (ideally a solution) of the respective binder in tap water under stirring in a VMA Dispermat® (VMA-Getzmann GmbH, Reichshof, Germany) with a 70 mm dispersing disk, and subsequently stirring the mixture for 1 hour. The coating formulations were screened over a small tea-sieve having a screen size of 500 µm, and the solids content was determined (cf. tables 8 and 9). Subsequently, the solids content was adjusted by adding further water.

The resulting coating formulations were coated onto an impermeable plastic substrate (Synteape®) with coating rods 1-3. Two papers were coated per colour and coating rod.

Drying circles were carried out in a belt dryer at 150° C. with a band speed of 6-7 until the colour is dry.

The Synteape® papers coated with samples 26, 27, 28 and 29 were additionally sprayed with a solution of 2.8 g stearic acid in 46.0 g ethanol (6 wt % solution) into a small fume hood. The solution was prepared by heating the ethanol to 50° C. in a water bath. After the solvent had reached the temperature, the stearic acid was added manually, mixed by rotation in a round bottomed flask and then sprayed directly on the surface of the coated papers.

In the case of samples 26SA1 and 26 SA2 one or two spray cycles, respectively, were carried out to obtain a good coating layer (cf. table 11). In the case of samples 27 to 29 the coated sheets were sprayed until the layer weight given in table 12 was obtained.

2.2. Determination of the Contact Angle

For determining the contact angle, the coated sheets were wetted by dropping 5 µl deionized water during 120 s onto the sheet surface. The drop thus formed was photographed and the contact angle was determined with the aid of the measuring module of the Image Access database Image Access Version 8.

TABLE 11

Coating weights

| Trial | Average coating/ sheet [mg] | Average coating/ sheet [mg/cm$^2$] | Average Contact angle [°] | Std. deviation [°] |
|---|---|---|---|---|
| Sample 23 | 265.0 | 0.1 | 128 | 5 |
| Sample 24 | 321.0 | 0.1 | 132 | 2 |
| Sample 25 | 200.5 | 0.1 | 124 | 3 |
| Sample 26 | 313.5 | 0.1 | 144 | 5 |
| Sample 26SA2 | 313.5 | 0.1 | 140 | 3 |
| Sample 26SA2 | 313.5 | 0.1 | 131 | 6 |

TABLE 12

Coating and Post-layer weights

| Trial | Average coating/ sheet [mg] | Average coating/ sheet [mg/cm$^2$] | Average postlayer/ sheet [mg] | Average postlayer/ sheet [mg/cm$^2$] | Average Contact angle [°] | Std. deviation [°] |
|---|---|---|---|---|---|---|
| Sample 27SA | 34.7 | 0.1 | 149.7 | 0.3 | 139.8 | 9.5 |
| Sample 28 | 140.3 | 0.3 | — | — | 130.9 | 3.0 |
| Sample 28SA | 140.3 | 0.3 | 149.2 | 0.3 | 144.9 | 8.1 |
| Sample 29 | 105.6 | 0.2 | — | — | 103.2 | 12.1 |
| Sample 29SA | 105.6 | 0.2 | 148.8 | 0.3 | 122.7 | 12.5 |

Figure 16:
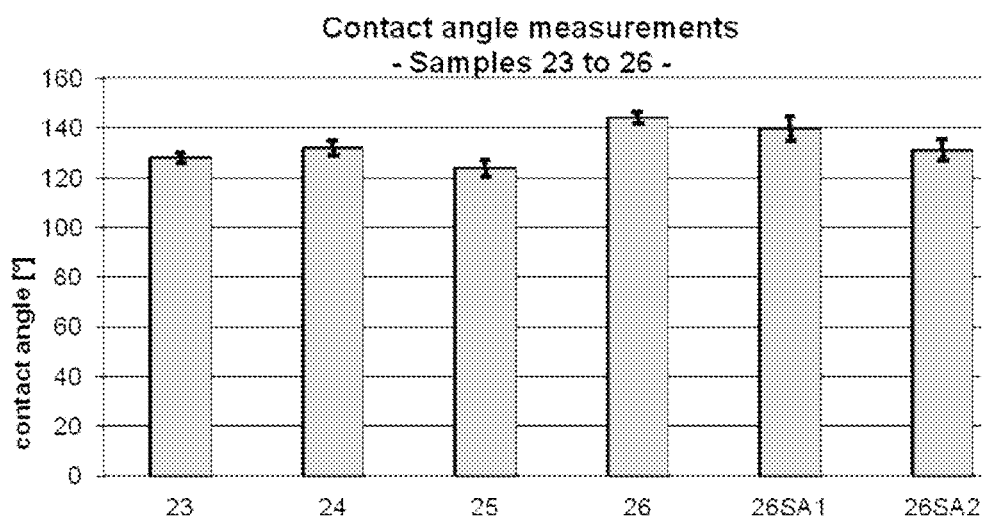
FIG. 16 shows contact angles of substrates coated with different samples of pre-hydrophobized hedgehog shaped particles using different hydrophobizing agents, and post-layers of hydrophobizing agents.

From FIG. 16, the influence of untreated PCC 2 combined with different hydrophobizing agents and binder upon preparation of a coating formulation is illustrated by the contact angles of samples 23 to 26, wherein any one of the samples provide a good hydrophobicity reflected by contact angles of around 124 to 132°. The hydrophobization can even be increased by a combination of the hydrophobizing agents as reflected by sample 26 providing a contact angle of 144°.

Furthermore, several tests were made with respect to a further hydrophobization of sample 26 by post-layering with stearic acid. As can be seen from FIG. 16, this treatment resulted in a decrease of the hydrophobization.

The contact angle of sample 27 exemplifying hydrophobization by post-layering only, illustrates that a high hydrophobization degree can also be achieved by post-layering.

Figure 17:
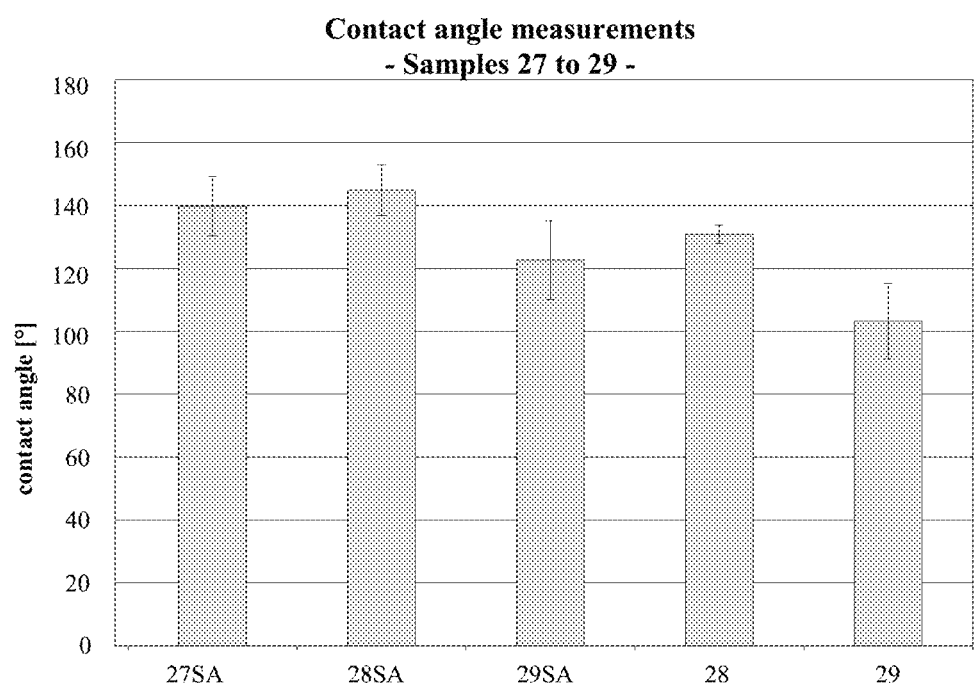
FIG. 17 shows contact angles of substrates coated with different coating formulations and post-layers according to the invention.

Finally, the contact angles of samples 28 and 29 show the influence of different hydrophobizing agents combined with untreated PCC and binder upon preparation of a coating formulation, wherein the hydrophobization in both cases can be increased by post-layering as exemplified by samples 28SA and 29SA (cf. FIG. 17).

The invention claimed is:

1. A method for controlling the wettability of a substrate surface comprising:
    a) coating the substrate surface with a coating formulation comprising a mixture of
        i) at least one binder,
        ii) hydrophilized hedgehog shaped particles pre-treated and coated with at least one hydrophilizing agent but not a hydrophobizing agent and hydrophobized hedgehog shaped particles pre-treated and coated with at least one hydrophobizing agent but not a hydrophilizing agent, and
        iii) optionally at least one hydrophobizing agent or at least one hydrophilizing agent, to form a coating layer; and
    b) applying one or more post-layers of at least one hydrophobizing agent and/or at least one hydrophilizing agent on top of the coating layer,
    wherein the at least one hydrophilizing agent is chosen independently in each instance of ii), iii), and b); and
    wherein the at least one hydrophobizing agent is chosen independently in each instance of ii), iii), and b).

2. The method of claim 1, wherein the substrate is selected from the group consisting of paper, board, wall-paper, wood, a wood composite, flake board, a plastic, foil, concrete, a coated rendering, an uncoated rendering, plaster, a metal, a ceramic, stone, a brickstone and glass.

3. The method according to claim 1, wherein the coating formulation does not include the at least one hydrophobizing agent or the at least one hydrophilizing agent in iii).

4. The method according to claim 1, wherein the coating formulation in iii) comprises the at least one hydrophobizing agent.

5. The method according to claim 1, wherein the coating formulation in iii) comprises the at least one hydrophilizing agent.

6. The method according to claim 1, wherein the at least one hydrophobizing agent is applied as the one or more post-layers in b).

7. The method according to claim 1, wherein the at least one hydrophilizing agent is applied as the one or more post-layers in b).

8. The method according to claim 1, wherein the coating formulation in iii) does not include the at least one hydrophobizing agent or the at least one hydrophilizing agent, and the at least one hydrophobizing agent is applied as the one or more post-layers in b).

9. The method according to claim 1, wherein the hedgehog shaped particles are composed of aragonitic precipitated calcium carbonate in a form of clusters of needle like crystals.

10. The method according to claim 1, wherein the hedgehog shaped particles are clusters and/or aggregates of scalenohedral precipitated calcium carbonate.

11. The method according to claim 1, wherein the at least one binder is a styrene-acrylic latex, an acrylonitrile, a polyvinyl alcohol or linseed oil.

12. The method according to claim 1, wherein the at least one hydrophobizing agent is chosen independently in each instance of ii), iii), and b) from the group consisting of fatty acids, stearic acid, palmitic acid, and their salts; alkylketene dimer;
polyacrylamide resins; silicone resins, polysiloxanes, polysiloxane modified with a functional silicone resin, and any mixture thereof.

13. The method according to claim 1, wherein the at least one hydrophilizing agent is chosen independently in each instance of ii), iii), and b) from the group consisting of polyacrylic acids, salts of 1-hydroxyethane-1, 1-diphosphonic acid, alkali metal salts thereof, potassium salts thereof chelates of 1-hydroxyethane-1, 1-diphosphonic acid, aluminium hydroxide chelates thereof, aluminium hydroxide/1-hydroxyethane-1,1-diphosphonic acid chelates having a weight ratio of 1:5, and any mixture thereof.

14. The method according to claim 1, wherein the at least one binder is present in the coating formulation in an amount of up to 250 wt % based on the weight of the hedgehog shaped particles.

15. The method according to claim 1, wherein the at least one binder is present in the coating formulation in an amount of 3 to 25 wt %, based on the weight of the hedgehog shaped particles.

16. The method according to claim 1, wherein the coating formulation further comprises one or more additives selected from the group consisting of dispersing agents, siliconizing agents, thickeners, rheology modifiers, anti-settling agents, defoamers, antioxidants, bluing agents, surfactants, crosslinkers, flame retardants, catalysts, pH buffers, fillers, dyes, pigments, optical brighteners, waxes, coalescence agents, and biocides.

17. The method according to claim 1, wherein the coating formulation is in the form of a solution or dispersion in a liquid medium.

18. The method according to claim 1, wherein the coating formulation is in the form of a medium comprising one or more of water, an alcohol ether, an alcohol, an aliphatic hydrocarbon, and an ester.

\* \* \* \* \*